US 9,412,078 B2

(12) United States Patent
Motsinger

(10) Patent No.: US 9,412,078 B2
(45) Date of Patent: Aug. 9, 2016

(54) ONLINE PERFORMANCE VENUE SYSTEM AND METHOD

(76) Inventor: Krystina Motsinger, Winterville, GA (US)

( * ) Notice: Subject to any disclaimer, the term of this patent is extended or adjusted under 35 U.S.C. 154(b) by 738 days.

(21) Appl. No.: 13/212,289

(22) Filed: Aug. 18, 2011

(65) Prior Publication Data

US 2011/0307549 A1 Dec. 15, 2011

Related U.S. Application Data

(63) Continuation of application No. 11/803,749, filed on May 15, 2007, now abandoned.

(60) Provisional application No. 60/800,381, filed on May 15, 2006.

(51) Int. Cl.
| | | |
|---|---|---|
| G06F 3/048 | (2013.01) | |
| G06F 17/30 | (2006.01) | |
| G09B 15/00 | (2006.01) | |
| G06F 3/00 | (2006.01) | |
| G06Q 10/00 | (2012.01) | |

(52) U.S. Cl.
CPC ...................................... G06Q 10/00 (2013.01)

(58) Field of Classification Search
CPC ......... G06Q 10/10; G06F 3/048; G06F 17/30; G06F 3/00; G09B 15/00
USPC .......................................................... 715/753
See application file for complete search history.

(56) References Cited

U.S. PATENT DOCUMENTS

| | | | | |
|---|---|---|---|---|
| 5,532,735 A | * | 7/1996 | Blahut et al. ..................... 725/32 | |
| 5,952,599 A | | 9/1999 | Dolby et al. | |
| 6,067,566 A | | 5/2000 | Moline | |
| 6,288,317 B1 | * | 9/2001 | Willis ............................. 84/600 | |
| 6,397,036 B1 | * | 5/2002 | Thean ...................... G09B 5/14 434/322 | |
| 6,482,087 B1 | | 11/2002 | Egozy et al. | |
| 6,483,019 B1 | | 11/2002 | Hamilton | |
| 6,541,692 B2 | | 4/2003 | Miller | |
| 6,653,545 B2 | * | 11/2003 | Redmann et al. ............... 84/615 | |
| 6,721,741 B1 | * | 4/2004 | Eyal et al. | |
| 6,769,010 B1 | * | 7/2004 | Knapp et al. ................... 709/203 | |
| 6,963,848 B1 | * | 11/2005 | Brinkerhoff ................. 705/7.32 | |
| 6,975,995 B2 | | 12/2005 | Kim | |
| 7,157,638 B1 | * | 1/2007 | Sitrick ........................ 84/477 R | |
| 7,228,305 B1 | * | 6/2007 | Eyal et al. | |
| 7,518,051 B2 | * | 4/2009 | Redmann ........................ 84/601 | |
| 7,884,274 B1 | * | 2/2011 | Wieder ............................ 84/609 | |
| 2001/0025259 A1 | | 9/2001 | Rouchon | |
| 2002/0091455 A1 | * | 7/2002 | Williams ........................ 700/94 | |
| 2002/0112002 A1 | | 8/2002 | Abato | |
| 2002/0144586 A1 | | 10/2002 | Connick, Jr. | |
| 2002/0144587 A1 | | 10/2002 | Naples et al. | |
| 2002/0165921 A1 | | 11/2002 | Sapieyevski | |
| 2003/0164084 A1 | | 9/2003 | Redmann et al. | |
| 2004/0011187 A1 | | 1/2004 | Park | |
| 2004/0152062 A1 | | 8/2004 | Adams | |

(Continued)

*Primary Examiner* — Jennifer To
*Assistant Examiner* — Hugo Molina
(74) *Attorney, Agent, or Firm* — Baker Donelson; Nigamnarayan Acharya

(57) ABSTRACT

An online performance venue system and method including a central server and a plurality of user terminals allows users to meet, communicate, learn, and perform. Users may perform live, record their performances for later playback or download, such as for a fee. Users may further create groups or bands and perform and record together. The system includes a number of additional features to foster an online community of system users.

13 Claims, 19 Drawing Sheets

(56) References Cited

U.S. PATENT DOCUMENTS

| | | |
|---|---|---|
| 2004/0159216 A1 | 8/2004 | Davis et al. |
| 2005/0076376 A1 | 4/2005 | Lind |
| 2006/0003302 A1* | 1/2006 | Fisher .................... G09B 19/00 434/306 |
| 2006/0112814 A1 | 6/2006 | Paepcke |
| 2006/0123976 A1 | 6/2006 | Both et al. |
| 2006/0259469 A1* | 11/2006 | Chiu ................................ 707/3 |
| 2006/0271620 A1* | 11/2006 | Beaty et al. .................. 709/203 |
| 2007/0214260 A1 | 9/2007 | Juszkiewicz |

* cited by examiner

ONLINE PERFORMANCE VENUE SYSTEM AND METHOD

PRIORITY CLAIM

This patent application is a continuation of U.S. patent application Ser. No. 11/803,749, filed May 15, 2007, entitled ONLINE PERFORMANCE VENUE SYSTEM AND METHOD, which claims priority to U.S. Provisional Patent Application No. 60/800,381, filed May 15, 2006, entitled ONLINE PERFORMANCE BASED VENUE SYSTEM AND METHOD, the disclosures of which are incorporated herein by reference in their entirety.

TECHNICAL FIELD

The present invention relates generally to the field of interactive online systems, and, more particularly, to an online performance venue system and method.

BACKGROUND OF THE INVENTION

Music of all kinds has long played an influential role in defining human society, evidenced by its very early development, myriad forms, and inter-cultural appeal. Nevertheless, music has traditionally been a predominantly local phenomenon, with the widespread distribution of recorded music being a relatively recent development. As such, musicians have traditionally found their introduction to music, their training, and their inspiration on a local level. Thus, it is no surprise that groups of musicians are likewise typically formed from individuals from the same community or culture. This traditional framework, in which musicians learn, grow, collaborate, and create, suffers from the geographical boundaries that restrict access to musical styles and trends, and the musicians from different cultures from around the country and around the globe who bring them to life.

To some extent, recent advances in technology have addressed the need for improved access to varying musical styles prevalent in different geographical areas, as well as to geographically isolated musicians working within the same or similar style. For example, record companies and other traditional music suppliers have recognized the growing interest among many individuals in diverse styles of music and, accordingly, have begun recording and distributing music of various styles from around the world on a larger, although still insufficient scale. Additionally, the availability of digital music via the Internet has enabled interested individuals to search out and obtain music from around the world.

Many problems remain, however, with current systems for distributing music. Among these are the high cost associated with production of traditionally recorded and distributed music, including music distributed via the Internet, and the specialized facility required for such production. As a result, access to adequate facilities for recording and distributing music is markedly limited for many musicians, including many professional musicians. Furthermore, almost no progress has been made toward eliminating the barriers between musicians that impede collaboration and influence, be they geographic, linguistic, cultural, or the like.

Thus, it is apparent that a need exists for a system in which musicians from around the world performing all styles of music may meet, interact, perform, listen, learn, comment, collaborate, and grow, including a system and method of music production and distribution that allows musicians to perform together regardless of their respective locations and schedules.

BRIEF SUMMARY OF THE INVENTION

Briefly described, in a preferred embodiment, the present invention overcomes the above-mentioned disadvantages and meets the recognized need for such a system and method by providing a network-based virtual community, wherein users may create unique accounts and meet fellow musicians and/or enthusiasts. The system preferably provides forums for discussion and performance, whereby users may gain exposure, education, and feedback. Discussion forums may take the form of text or voice chat rooms, bulletin boards, message boards, discussion boards, instant messages, emails, or the like, whereby users have access to varying forms of communication with fellow users, preferably having varying degrees of formality. Users may perform live via transmission of a digital stream of data containing their performance, such as in a live collaboration, live rehearsal, live concert, or the like. Alternatively, users may perform via streaming replay of recorded performances or via download of recorded performances. Preferably, at least one form of discussion forum is associated with a given performance through which feedback, or other comment, may be provided contemporaneously by members of the audience, whereby collaboration and education of both the performers and the audience members may take place.

According to its major aspects, and broadly stated, the present invention, in its preferred form, is a network-based system wherein musicians may create and/or perform music with or without an audience, give and receive feedback or other comments, and meet, collaborate, and perform with other musicians.

More specifically, the invention features a server connected to one or more client terminal via a network, wherein the server provides an online performance venue via receipt and transmission of music data to and from one or more client terminals. The system further preferably includes a graphic interface provided to each of the client terminals from the server via the network to facilitate navigation and use thereof. Preferably, the graphic interface takes the form of a website featuring a plurality of pages. The server preferably further provides a connection between client terminals to allow users to communicate with one another.

Separate pages are preferably provided for various features of the system. For example, a login page is preferably included whereby users may log into an account to access the system and/or to identify themselves within the system. A home page or main page is preferably provided to allow a user to begin navigation of the system by selecting links associated with different features of the system based on what the user desires to accomplish. Among the many features contemplated, the home page may include respective links to chat rooms, discussion boards, performance areas, a search tool, a reference tool, a store area, an account management area, a sign-up area, or the like, each preferably implemented in one or more webpage.

The system preferably allows a user to perform music in a variety of ways. One performance method involves a user giving a live performance through streaming transmission from the user's client terminal to the server, and then from the server to selected audience members via respective client terminals. Another performance method involves replay of a recorded performance, such as a performance stored on the server, such as by one or more user accessing the recorded performance to receive a streaming transmission thereof via one or more client terminal for listening or saving.

The streaming transmissions may further be used to facilitate group or ensemble performances via a method involving transmission of a first user's performance data from a first user terminal to a second user at a second user terminal, either directly or via the server. The second user may transmit a second performance on top of the first user's performance to a third user. The third user may subsequently add an additional layer containing a third performance. Such layering of performances may preferably be continued as desired, and may preferably be done on a real-time basis, a near real-time basis, or on a time-delay basis, thereby allowing contribution from a nearly unlimited number of users, regardless of their location and/or schedule. Such layering further preferably results in a final streaming transmission of a group or ensemble performance to the server from the last user, whereby the final transmission may be stored on the server and/or broadcast live as it is received to an audience of users.

The communication feature may preferably be accomplished via the server by providing access to one or more client terminal to musical performances created by users and saved on the server. Additionally, users may communicate with one another via text or voice communication, such as in the form of discussion forums, message boards, chat rooms, instant messaging, email, user webpages hosted on the server, and the like. These features of the server are preferably provided as interactive webpages, wherein users may create new postings for discussion, reply to postings by others, contemporaneously chat about streaming music as they listen, such as a live performance or a recorded performance, and/or chat about music in general, among other topics, such as in dedicated chat rooms. The system preferably includes a translation function to allow users who speak different languages to communicate with one another.

Each user preferably maintains an account which is unique to the user. Accounts of various types are preferably available to a user either by selection or by participation in the system in the form of a reward. The user's account preferably includes associated information about the user's preferences, both for use of the system as well as musical preferences, such as a preferred instrument to play, or a preferred genre or user to listen to or collaborate with. The user's account preferably further includes an associated avatar or other icon that pictorially or graphically represents the user, and may be displayed by the system in association with the user's musical performances, message postings, attendance at a performance, or the like. The user's avatar or icon is preferably customizable, such as by selection of various characteristics by the user during an account creation or management procedure. Preferably, a user's participation in selected features or portions of the system are rewarded by granting the user's account special privileges, titles, awards, or other recognition, which may or may not be viewable by other users. A preferred reward allows the user to access otherwise restricted options for customization of the user's avatar.

The system preferably further provides a musical encyclopedia which may be used as a reference for interested individuals, regardless of whether they maintain a user account or of what type of account the user maintains. The encyclopedia is preferably editable by users, wherein users may add or modify entries in the encyclopedia.

Accordingly, a feature and advantage of the present invention is its ability to provide a performance venue for users over a network, whereby a user's performance may reach large audiences without geographic or logistic barriers, and whereby music enthusiasts may experience performances by users playing in a wide range of styles from all over the world through a single system at their convenience.

Another feature and advantage of the present invention is its ability to allow musicians from around the world to meet, communicate, collaborate, and perform together regardless of location, language, or schedule.

Yet another feature and advantage of the present invention is its ability to allow musicians to record and distribute performances, either solo or ensemble, such as by download of streaming digital music data, with or without a fee.

These and other features and advantages of the invention will become more apparent to those ordinarily skilled in the art after reading the following Detailed Description and Claims in light of the accompanying drawing Figures.

BRIEF DESCRIPTION OF THE DRAWINGS

Accordingly, the present invention will be understood best through consideration of, and reference to, the following Figures, viewed in conjunction with the Detailed Description referring thereto, in which like reference numerals throughout the various Figures designate like structures, and in which.

DETAILED DESCRIPTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Figure 1:
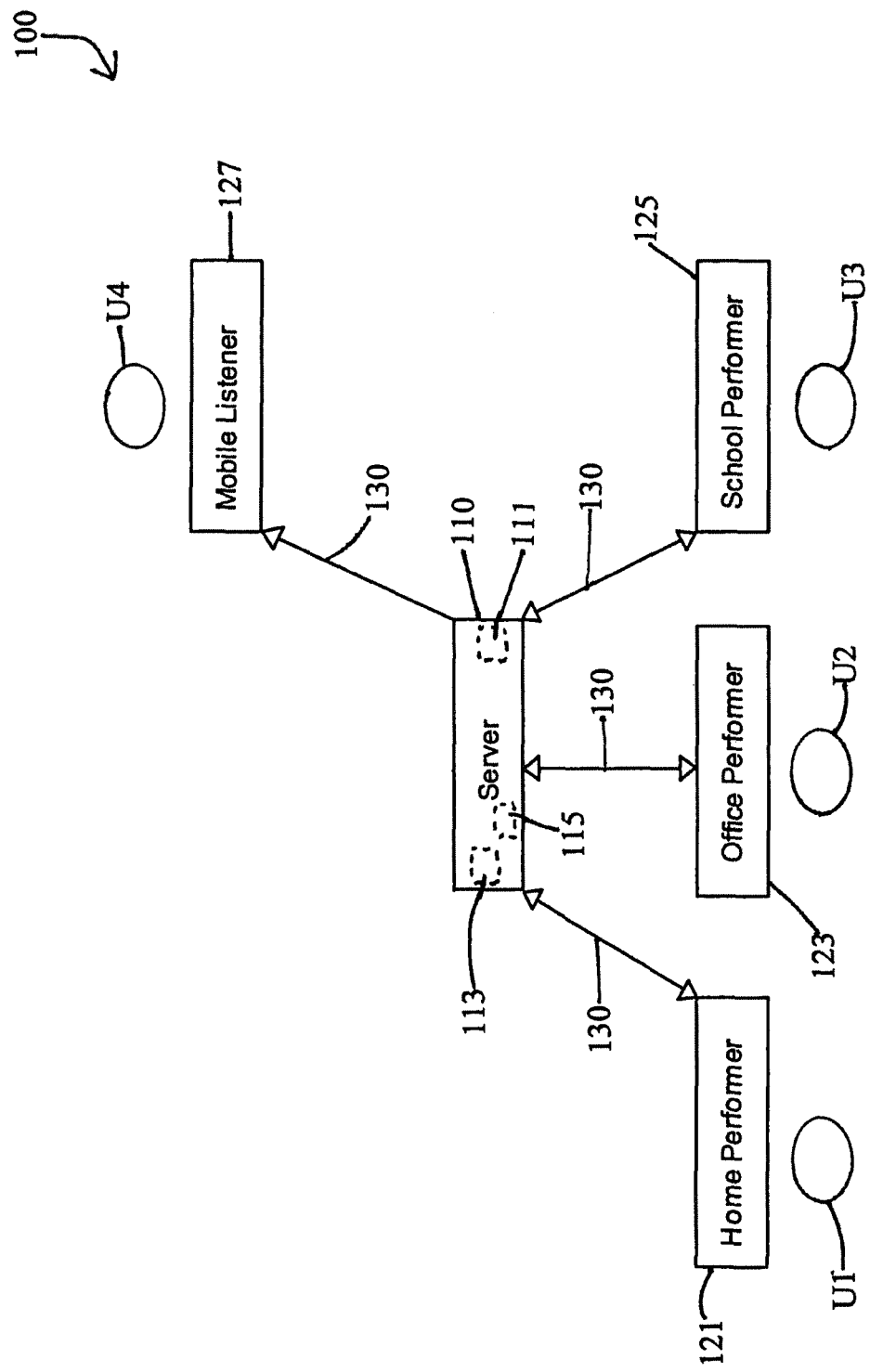
FIG. 1 is a schematic view of a network-based music performance venue system according to the present invention.
Figure 2:
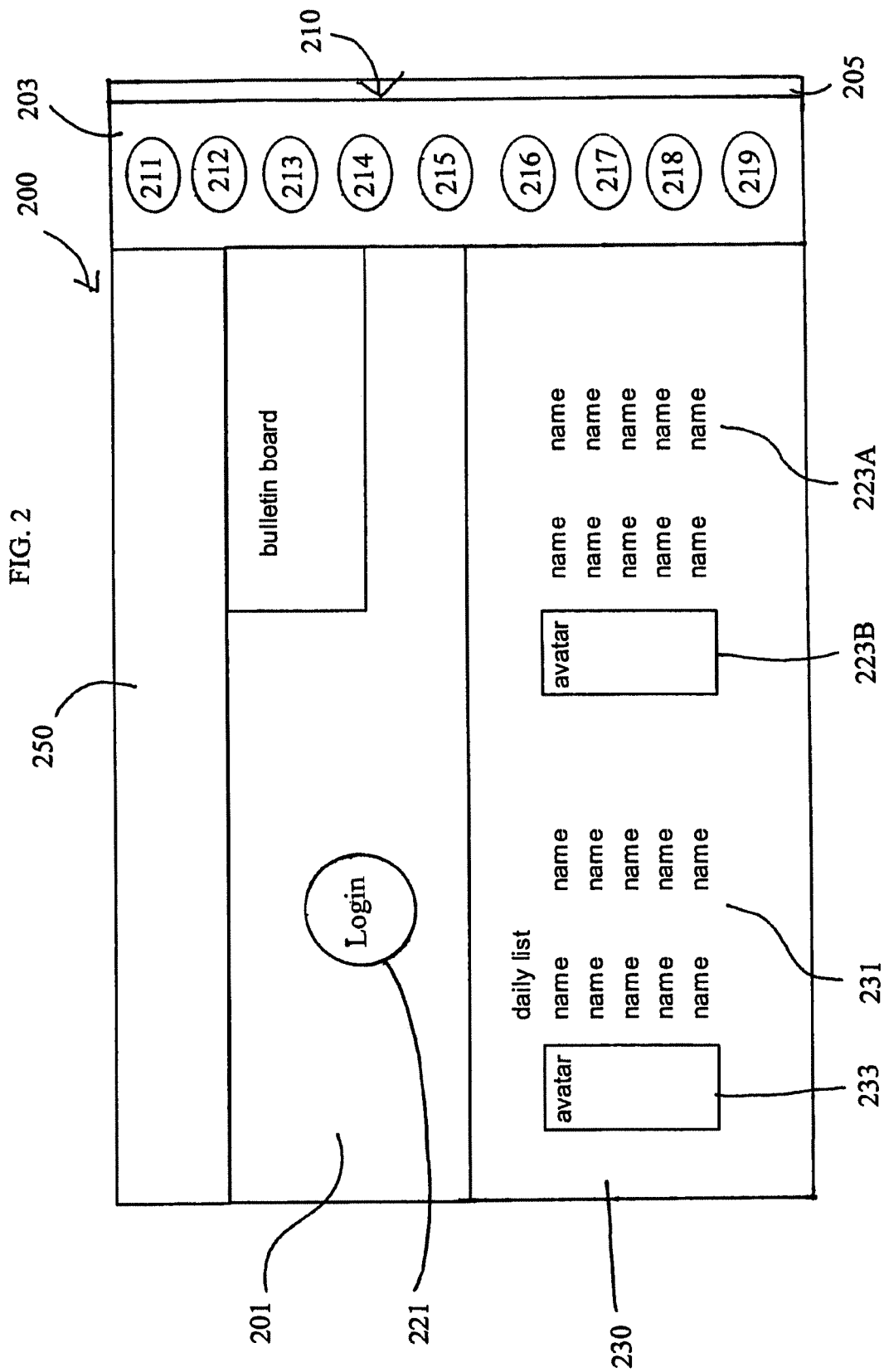
FIG. 2 is a plan view of a display provided by the music performance venue system of the present invention for initial navigation.
Figure 3:
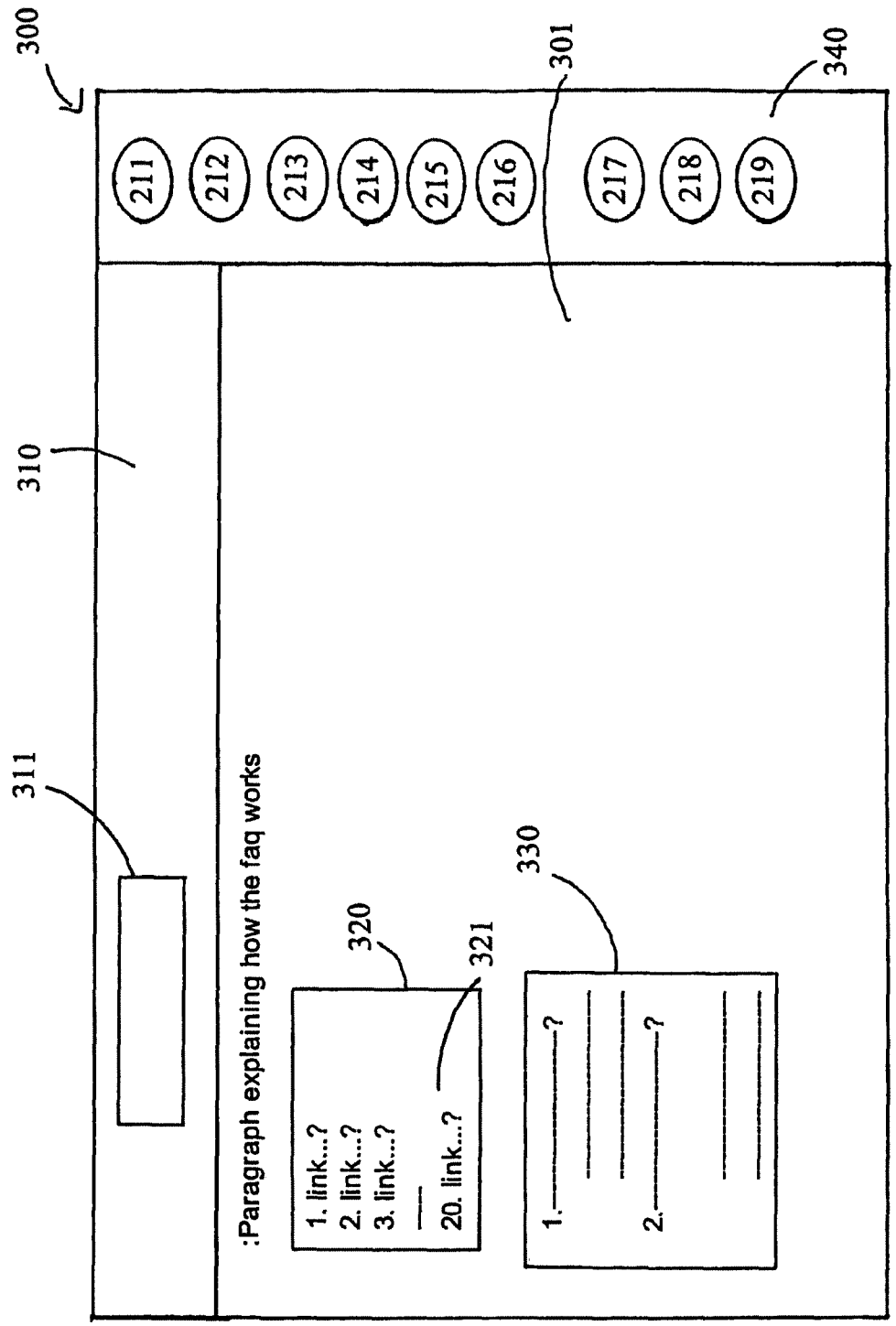
FIG. 3 is a plan view of a display of the music performance venue system of the present invention informing users about the system.
Figure 4:
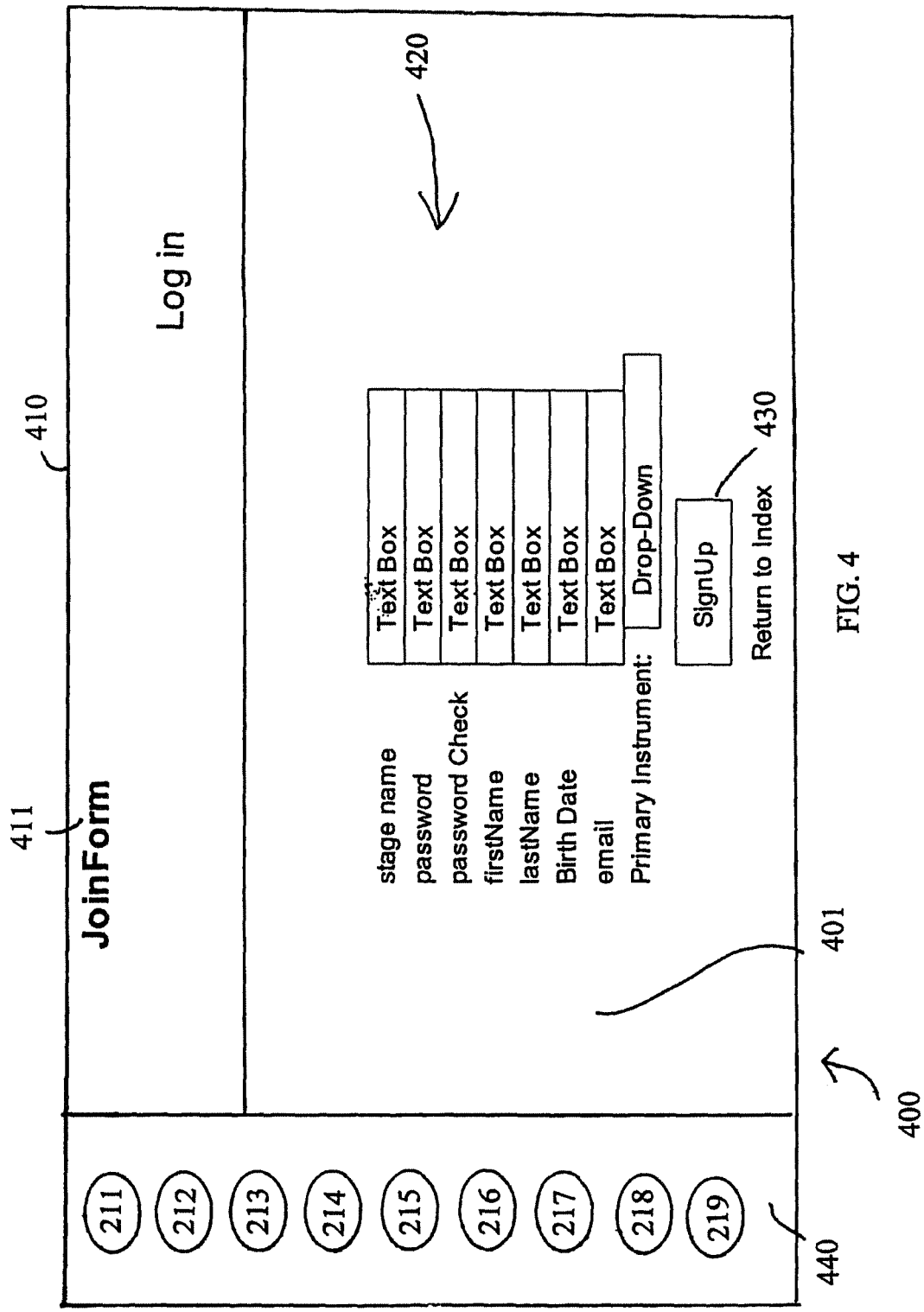
FIG. 4 is a plan view of a display of the music performance venue system of the present invention allowing users to join the system.
Figure 5:
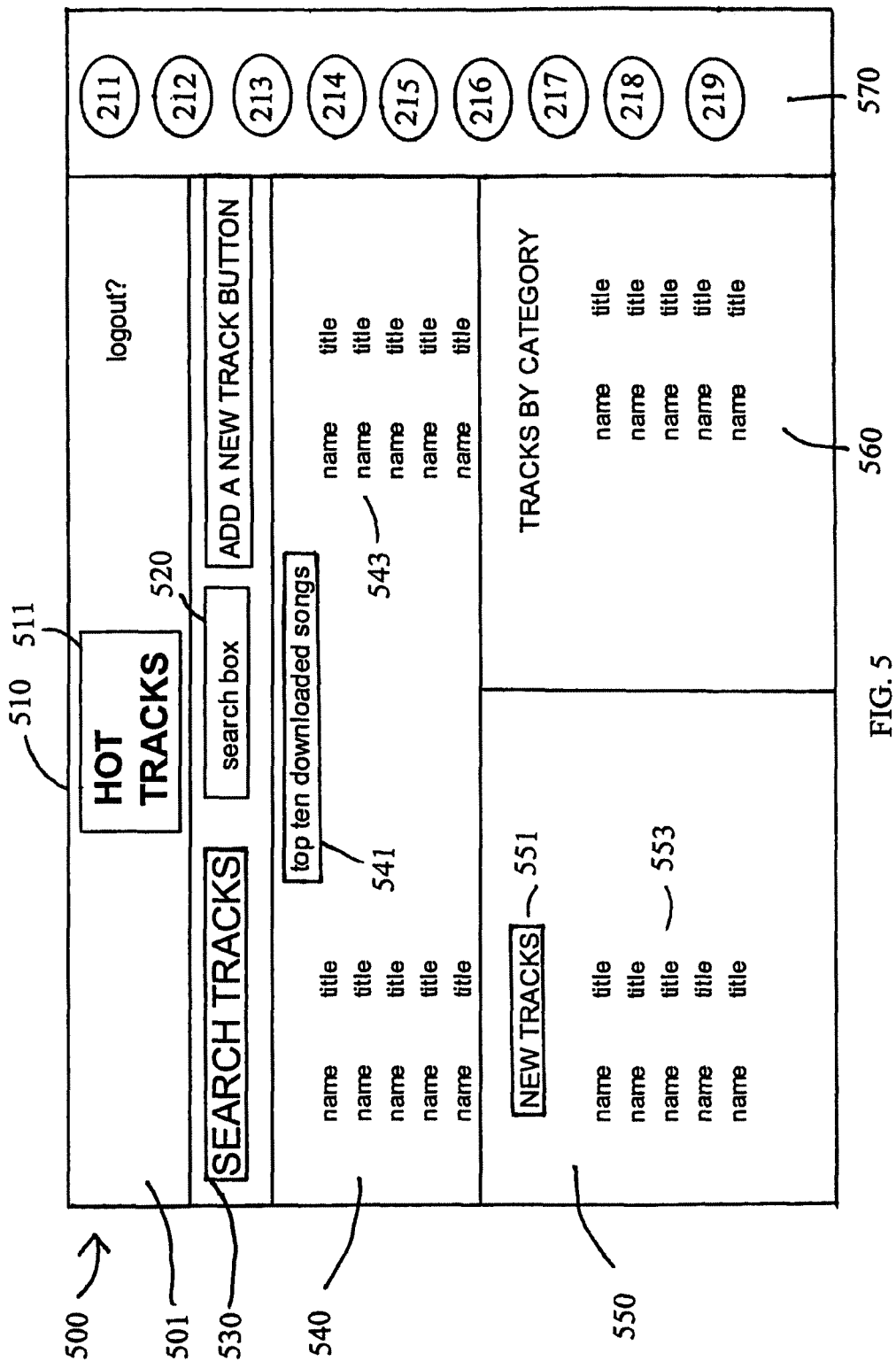
FIG. 5 is a plan view of a display of the music performance venue system of the present invention showing high-ranked recorded performances accessible by users of the system.
Figure 6:
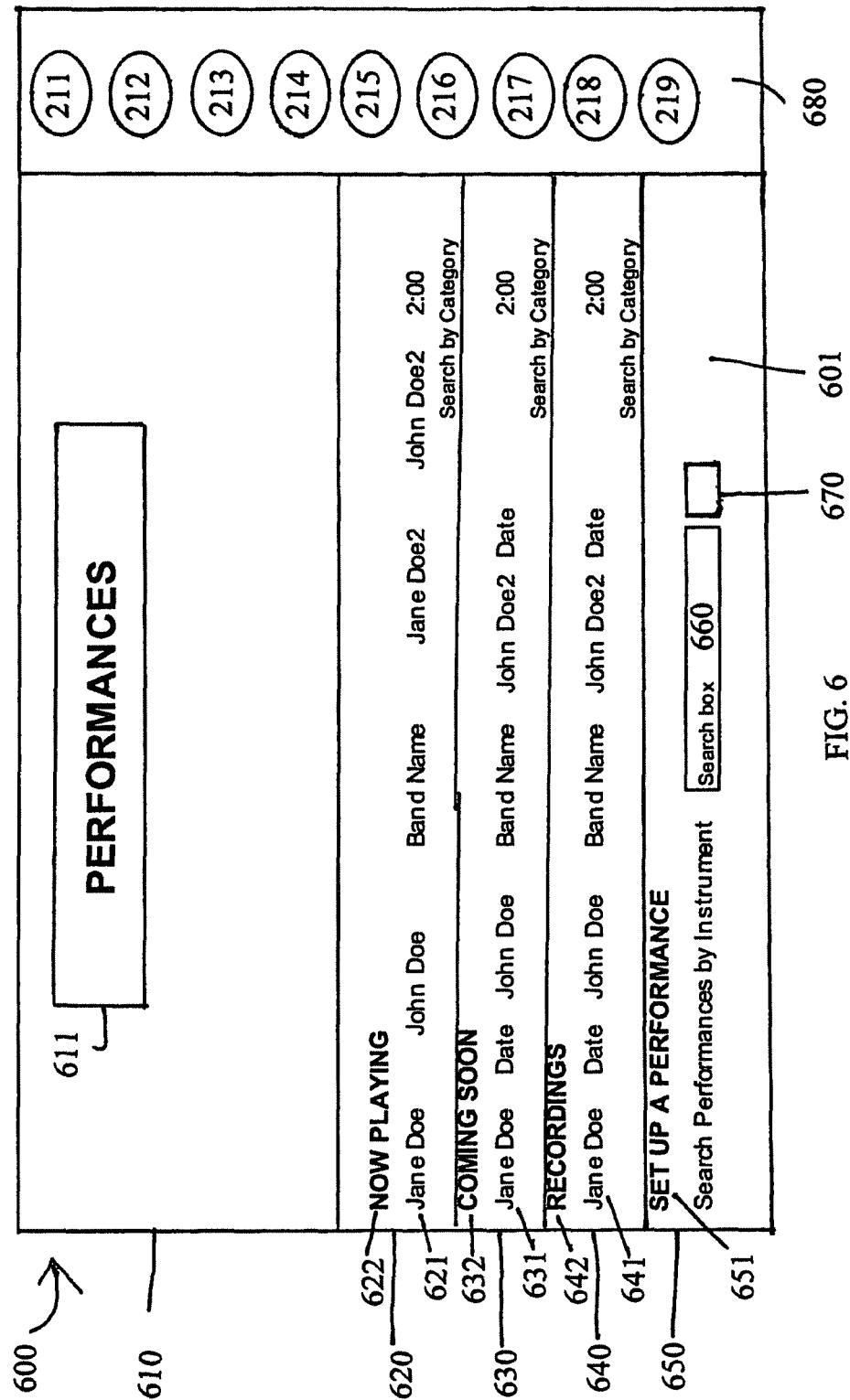
FIG. 6 is a plan view of a display of the music performance venue system of the present invention allowing users to access all performances on the system.

In that form of the preferred embodiment of the present invention chosen for purposes of illustration, FIG. 1 shows system 100 including server 110 connected to a plurality of user terminals 121, 123, 125, and 127 via network 130. Preferably, system 100 is provided with sufficient capability to support connection of hundreds, thousands, hundreds of thousands, or more user terminals to server 100. Additionally server 100 may be formed as a plurality of servers.

Server 110 preferably comprises a computer or a network of computers including communication portion 111, storage portion 113, and processing portion 115. Communications portion 111 preferably connects to network 130, such as the Internet, and preferably facilitates with user terminals 121, 123, 125, and 127 to allow communication therebetween. Storage portion 113 preferably comprises a computer readable medium and preferably stores data, such as user information, recording information, system information, or the like, and further preferably stores one or more computer executable program product, such as a program for recording an incoming stream of music data, a program for transmitting an outgoing stream of music data, a program for displaying displays of the system or of programs thereof on a user terminal, or the like. Processing portion 115 preferably executes the one or more computer executable program product stored on storage portion 113. Thus, server 110 preferably performs all of the system processes and functions described hereinbelow not performed by one of user terminals 121, 123, 125, and 127.

Network 130 preferably connects server 110 to each of user terminals 121, 123, 125, and 127, and preferably allows transmission of data, such as digital data thereover between server 110 and a selected user terminal. Network 130 preferably takes the form of the Internet, although other networks may be used, including wired networks, wireless networks, cellular networks, satellite networks, local networks, combinations thereof, or the like. Additionally, network 130 may facilitate direct communication between one or more user terminal, thereby reducing a burden on server 110 to pass communications between user terminals.

Each of user terminals 121, 123, 125, and 127 is likewise connected to network 130 such that a signal may be sent to and/or received from server 110 over network 130 via a communication unit, such as a modem or the like. Furthermore, each of user terminals 121, 123, 125, and 127 includes a processor unit and a computer readable storage medium having a computer executable program thereon for generating signals to be sent to server 110 and for generating a display to a user according to signals received from server 110. User terminals 121, 123, 125, and 127 preferably take the form of a personal computer, such as a desktop or laptop computer, but may alternatively take the form of a mobile device, such as a cellular phone, a personal digital assistant (PDA), a combination thereof, or the like capable of storing and executing a program and communicating with server 110.

In use, user U1 preferably initiates execution of a computer program product stored on user terminal 121 to communicate with server 110 over network 130, such as by transmitting a signal thereto. Preferably such signal indicates to server 110 that user U1 has initiated a program to access system 100. In response, server 100 preferably sends a signal to user terminal 121, such as a display signal containing display information. Upon receipt, user terminal 121 preferably creates a display viewable by user U1 according to the display information. Such initial display is preferably mainpage 200 in the form of a webpage. Alternatively, all of the displays may be stored on user terminal 121, such as part of an executable program product, and only information is provided from server 110 to be displayed on user terminal 121 within the executable program product.

Performance of music is preferably accomplished via connection of a musical instrument to a user terminal, either through a microphone, other analog pick-up device, or though direct input from an electric instrument. User terminal preferably captures music data from such connection for selective transmission to server 110 via network 130 upon activation of an appropriate function of system 100, such as by activation of a "record" button of a performance room or a practice room of system 100. Server 110 preferably receives the music data and transmits it to other users, saves it, or both, according to one or more computer program product running on server 110. Preferably, such transmission(s) are performed such that little or no degradation in signal quality results, and such that little or no delay is encountered between creation, transmission, receipt, and re-transmission and receipt of the music data. Alternatively users may locally record music data and subsequently transmit the music data to server 110 for storage and/or transmission to other users. The other users may preferably listen to the performance, add to the performance through similar capture and transmission of music data, and/or save the performance. Each user accessing a performance, whether as an audience member or as a collaborator, preferably has simultaneous access to communication with other users, whereby discussion, critique, suggestion, instruction, or the like is facilitated.

A rating system of system 100 for activities associated therewith is preferably included, and preferably comprises six grades, such as bronze, silver, gold, sapphire, emerald, and diamond. The rating system may be employed by users to rate a performance, a discussion board posting, an encyclopedia entry, a lesson posting, or the like, of another user. Accordingly, all users may preferably benefit from the comments and/or rating given to a particular contribution, such as by being able to assess the quality of such contribution. For example, a user, including associates of conventional recording companies, may search for new performances by rating, choosing only to listen to those performances which were rated highly, thereby facilitating quick and easy exposure to the best performances available on system 100, as rated by users thereof. Similarly, various lists included in the system may preferably be sorted according to rating, as well as by other criteria. As such, the ratings may preferably be used to determine a rank of a performance, a post, an encyclopedia entry, or the like for comparison with other such contributions to system 100, such as in a ranking system, and for recognition of users who make same.

A user rating system is likewise preferably included in system 100, whereby users may preferably accumulate points or other credit to advance through the rating system. Greater accumulation of points or credit preferably increases a user's rating, which may use the same six levels or different levels. Preferably, the user rating system includes six levels, such as bronze, silver, gold, sapphire, emerald, and diamond. Such points or credit may preferably be accumulated by contribution to system 100 and/or by ratings associated with such contributions.

For example, a user may get a predetermined number of points or amount of credit for simply giving a performance, creating an encyclopedia entry, recording a performance, accessing a performance by another user, rating another performance or other contribution, being chosen as a friend, giving advice through a mentor system, creating a discussion topic, referring a friend to use the system, or the like. Additional points or credit may be given for each additional user who joins the audience of the performance or who listens to a recorded version of the performance. Furthermore, additional points or credit may be accumulated if the performance achieves a predetermined rating, ranking, or both. Alternatively, points or other credit may be purchased, traded, or otherwise acquired.

Now referring to FIGS. 2-19, mainpage 200 preferably includes links 210, information 230, and banner 250. Activation of any of links 210, such as by clicking the link with a mouse, preferably causes a signal to be communicated to server 110 requesting information pertaining to a respective webpage. For example, activation of link 211 preferably sends a request to server 110 for information pertaining to an "about us" webpage. In response server 110 preferably transmits display information to user terminal 121, which uses same to display "about us" webpage 300, discussed in more detail hereinbelow. Similarly, activating each of links 212, 214, 215, 216, 217, 218, 219, 221, and 223 preferably causes user terminal 121 to display "join" webpage 400, "ratings" webpage 500, "recordings" webpage 600, "practice" webpage 700, "encyclopedia" webpage 800, "discussion" webpage 900, "chat" webpage 1000, "manage profile" webpage 1100, "login" webpage 1200, and "view profile" webpage 1300, respectively. In addition to links 210, mainpage 200 preferably includes additional information 230 that is viewable without activation of a link or any other action by user U1.

Information 230 preferably pertains to system 100, such as a list of top rated performances available on system 100. Information 230 is preferably stored on storage portion 113, such as in a database, and is preferably dynamically displayed, such as being updated in real-time, or periodically, according to a computer executable program product of server 110. Although no action is needed to view information 230, one or more portions of information 230 such as text 231 and/or avatar 233 may additionally act as a link to request and display an associated webpage. Finally, mainpage 200 preferably includes banner 250 comprising information outside system 100, such as an advertisement and/or a link to a webpage outside system 100.

Links 210 preferably include "about us" link 211, "join" link 212, "ratings" link 213, "recordings" link 214, "practice" link 215, "encyclopedia" link 216, "discussion" link 217, "chat" link 218, "manage profile" link 219, "login" link 221, and "view profile" link 223. Each of links 210 is preferably associated with a respective webpage for which information is stored on server 110. Activation of any of links 210 preferably causes such associated web site to be displayed on user terminal 121, whereby user U1 may preferably navigate system 100 to access selected functions thereof.

Links 210 preferably take the form of a hypertext link or a graphic element. For example, information 230, presented in the form of text, may function as view profile link 223. Specifically, information 220 may be a list of text 231 the top 10 highest rated performances on system 100 over the last week, or over the last day. Thus, activating hypertext "view profile" link 223a preferably displays "view profile" webpage 1300 corresponding to the ranked user. As a further example, graphic view profile link 223b preferably takes the form of a graphic icon, such as an avatar 233 corresponding to the ranked user. Preferably, clicking anywhere on the icon, or otherwise activating link 223b, causes "view profile" webpage 1300 to be displayed corresponding to the ranked user.

Preferably, one or more of links 210 comprise icons including graphic representations of musical instruments. As such, links 210 may be arranged anywhere on a webpage, such as mainpage 200, and preferably are arranged so as to create an image in conjunction with a background, such as background 201 of mainpage 200, such as an image of a stage, a concert hall, a café, a rehearsal room, a book, a library, a theatre, or the like. It will be understood, however, that one or more links 210 may alternatively be displayed in a separate bar, such as a side-bar, a header, a footer, or the like. Likewise, links 210 may be provided in pane 203, with or without scroll bar 205, or the like.

Activation of "about us" link 211, preferably formed as a graphic icon, such as a button with "What is Vivid M?" displayed thereon, by user U1 preferably causes user terminal 121 to display "about us" webpage 300. "About us" webpage 300 preferably includes header 310 containing an indication that "about us" webpage 300 is being displayed, Frequently asked questions 320, answers thereto 330, and pane 340 containing one or more links, such as links 211-219, all displayed over background 301. Background 301 is preferably selected to include one or more colors, patterns, images, or the like, optionally including animation, as desired. Frequently asked questions 320 preferably comprises a plurality of questions in the form of hypertext links that a new or old user may likely have and to which they may likely want to find an answer. Answers 330 are preferably arranged below frequently asked questions 320. A user may simply scroll or otherwise browse through answers 330 to preferably gain knowledge and/or familiarity with system 100. Alternatively, user U1 may activate one of hypertext links 321 to cause a corresponding portion of answers 330 to be displayed containing the answer to the corresponding question, such as in text form.

Activation of "join" link 212, preferably formed as a graphic icon, such as a button with "Join Up" displayed thereon, by user U1 preferably causes user terminal 121 to display "join" webpage 400. "Join" webpage 400 preferably includes header 410, entry fields 420, submit button 430, and pane 440 having links 211-219, displayed over background 401. Background 401 is preferably selected to include one or more colors, patterns, images, or the like, optionally including animation, as desired. Header 410 preferably includes title 411 identifying that "join" webpage 400 is being displayed. User U1 may preferably enter information, such as a desired stage name, a desired password, personal information, contact information, music information, payment information, or the like in entry fields 420. Preferably, when user U1 has completed entry of information in entry fields 420, user U1 may preferably activate submit button 430, thereby causing the entered information to be sent to server 110 for processing.

If user U1 has entered a unique stage name, a satisfactory password, and all required personal, contact, music, payment, and other information, server 110 will create an account, such as by storing the entered information on storage portion 113 for use by one or more executable computer program products, either stored on server 110 or on user terminal 121. If there is a problem with the entered information, server 110 preferably prompts user U1 to correct such problem and re-submit the user's information to create an account.

Activation of "ratings" link 213, preferably formed as a graphic icon, such as a button with "Hot Tracks" displayed thereon, by user U1 preferably causes user terminal 121 to display "ratings" webpage 500. "Ratings" webpage 500 preferably includes header 510, entry field 520, submit button 530, first information portion 540, second information portion 550, links 560, and pane 570 having links 211-219, all displayed over background 501. Background 501 is preferably selected to include one or more colors, patterns, images, or the like, optionally including animation, as desired. Header 510 preferably includes title 511, such as a graphic icon, indicating that "ratings" webpage 500 is being displayed.

User U1 may preferably enter information, such as a word, phrase, name, or the like in entry field 520. Activating submit button 530 preferably causes server 110 to search, such as on storage portion 113, for recorded performances having associated information matching the entered information, such as a performer's name, a performer's stage name, a recording title, a recording genre, a recording date, or the like. Server 110 preferably causes user terminal 121 to display a results webpage (not shown) containing a heading, a list of results with information matching the entered information, and a navigation pane having links. Each entry in the list is preferably formed as a link to "playback" webpage 1400, discussed in more detail below, whereby a selected recording may be played on user terminal 121 and whereby user U1 may listen to a selected recording.

First information portion 540 preferably includes header 541 indicating what information is displayed therein, such as "Top Ten Downloaded Songs", and hypertext links 543. Each of hypertext links 543 preferably comprises a text description of a respective one of the most frequently downloaded songs, such as over the last week, over the history of system 100, or the like. Clicking on any one of links 543 preferably causes "playback" webpage 1400 to be displayed, whereby user U1 may listen to a selected recording.

Second information portion 550 preferably includes header 551 indicating what information is displayed therein, such as "New Tracks", and hypertext links 553. Each of hypertext links 553 preferably comprises a text description of respective one of the most recently recorded songs, such as the ten most recently recorded songs, or the like. Clicking on any one of links 553 preferably causes "playback" webpage 1400 to be displayed, whereby user U1 may listen to a selected recording.

Links 560 preferably comprise a plurality of hypertext links, such as links to results webs (not shown) for recordings of a corresponding genre, musical instrument, or the like. The result webpage preferably includes a list of recorded songs in the selected genre, or the like. Preferably, the list may be sorted, such as by title, artist, recording date, rating, recording length, or the like, whereby user U1 may preferably browse all recordings within a selected genre or the like.

Activation of "recordings" link 214, preferably formed as a graphic icon, such as a button with "Performances" displayed thereon, by user U1 preferably causes user terminal 121 to display "recordings" webpage 600. "Recordings" webpage 600 preferably includes header 610, "now playing" section 620, "coming soon" section 630, "recordings" section 640, "new performance" section 650, entry field 660, submit button 670, and pane 680 having links 211-219, all displayed over background 601. Background 601 is preferably selected to include one or more colors, patterns, images, or the like, optionally including animation, as desired, and is preferably formed as a theatre sign. Header 610 preferably includes title 611, such as a graphic icon, indicating that "performances" webpage 600 is being displayed, such as arranged to form part of the theatre sign.

"Now playing" section 620 preferably contains truncated list 621 of scheduled performances currently underway or scheduled to start within a predetermined amount of time. List 621 preferably includes information corresponding to a respective performance, including a performer's stage name, a start time, an instrument, a genre, or the like. At least a part of such information is preferably displayed in the form of a hypertext link. User U1 may activate the link to display "playback" webpage 1400, whereby user U1 may listen to the selected performance along with one or more other users. "Now playing" section 620 preferably further comprises link 622, activation of which preferably causes "now playing chronological" webpage (not shown) to be displayed, containing a list of all performances currently underway or scheduled to begin within a predetermined amount of time, such as within five minutes. The list is preferably sorted chronologically, beginning with the performance that began the longest amount of time ago, and ending with the performance scheduled for the longest time in the future. Finally, "now playing" section 620 preferably comprises link 623, activation of which preferably causes "now playing genre" webpage (not shown) to be displayed, containing a list of all performances underway or scheduled to begin within a predetermined amount of time, such as within five minutes. This list is preferably sorted by genre of music, with separate chronological lists arranged below associated genre headings.

"Coming soon" section 630 preferably contains truncated list 631 of performances scheduled to start within at a later time, such as in an hour or more, the following day, or the like. List 631 preferably includes information corresponding to a respective performance, including a performer's stage name, a start time, an instrument, a genre, or the like. At least a part of such information is preferably displayed in the form of a hypertext link. User U1 may activate the link to create a reminder, such as an email reminder or a list of tagged performances. "Coming soon" section 630 preferably further comprises link 632, activation of which preferably causes "coming soon chronological" webpage (not shown) to be displayed, containing a list of all performances scheduled to begin at a later time, such as after one hour or more, the next day, or the like. The list is preferably sorted chronologically, beginning with the performance that will begin soonest, and ending with the performance scheduled for the longest time in the future (or last where the list is truncated by time till performance). Finally, "coming soon" section 630 preferably comprises link 633, activation of which preferably causes "coming soon genre" webpage (not shown) to be displayed, containing a list of all performances scheduled to begin after a predetermined amount of time, such as after one hour (and optionally before a predetermined amount of time, such as not more than one month). This list is preferably sorted by genre of music, with separate chronological lists arranged below associated genre headings.

"Recordings" section 640 preferably contains truncated list 641 of recorded performances. List 641 preferably includes information corresponding to a respective performance, including a performer's stage name, a start time, an instrument, a genre, or the like. At least a part of such information is preferably displayed in the form of a hypertext link. User U1 may activate the link to display "playback" webpage 1400, whereby user U1 may listen to the selected recorded performance. "Recordings" section 640 preferably further comprises link 642, activation of which preferably causes "recordings chronological" webpage (not shown) to be displayed, containing a list of all recorded performances. The list is preferably sorted chronologically, beginning with the most recently recorded performance. Finally, "recordings" section 640 preferably comprises link 643, activation of which preferably causes "recordings genre" webpage (not shown) to be displayed, containing a list of all recorded performances. This list is preferably sorted by genre of music, with separate chronological lists arranged below associated genre headings.

"New performance" section 650 preferably includes link 651 which, upon activation, preferably displays "new performance" webpage (not shown). "New performance" webpage (not shown) preferably allows user U1 to create a new "performance hall" webpage 1500 for immediate use and/or schedule a performance for a later time. User U1 may preferably enter information pertaining to the performance, such as by entry of text or the like in one or more entry fields, by selection of options from one or more drop-down menus or radio buttons, or the like. When user U1 has completed setting up the new performance by entering information pertaining thereto, user U1 may then submit the information, such as by activating a button. Preferably, user U1 will enter information pertaining to a time of the performance, including a date and time, an instrument to be played, a musical style of the performance, a type of venue, access restrictions, a title, or the like. Upon submission, server 110 preferably stores the information, such as in a database for later retrieval, such as for creating a list of scheduled performances or performances in progress, or for alerting selected users of the performance through text messages, emails, banners, pop-ups, or the like. Selection of the type of venue preferably determines how many, and which users will be able to join the venue, perform, listen to the performance, chat (either before, during, or after the performance), rate the performance, and the like. Users preferably have full control over all aspects of the performance to ensure that system 100 is flexible enough to meet the performance needs of all users. Thus, performances may be on a large or small scale, may be accessed by all users or restricted as desired, may be recorded or not, rated or not, advertised or not, as desired by the performing user, or users in the event of a group performance.

Entry field 660 is preferably useful for finding performances of all kinds, such as by searching server 110. Such searching is preferably conducted via entry of a word, phrase, name, stage name, instrument, genre, date, time, title, or the like. User U1 may preferably activate submit button 670 to generate and display a filtered list of performances or all types, i.e. "now playing", "coming soon", and "recordings" having associated information (e.g. performer name, performer stage name, song title, band name, genre, instrument, rating, or the like, such as stored on server 110) matching the entered word, phrase, name, time, or the like. Such a filtered list may preferably be displayed on a new webpage, and may include headings, navigation panes with links to other sections of system 100, links to different sections of the list, such as "now playing", "coming soon", "recordings", or the like, additional or alternative filters, such as filters that display a new list having only performances of a selected genre, instrument, rating, or the like.

Thus, a user may preferably access performances by other users, whether live or recorded, and may preferably create new performances, whether solo or group performances, recorded or live, via "performance" webpage 600. Each of the sections of "performance" webpage 600 described may be altered to suit the needs of users, either globally throughout system 100 or for an individual user, such as through the user's profile settings.

Figure 7:
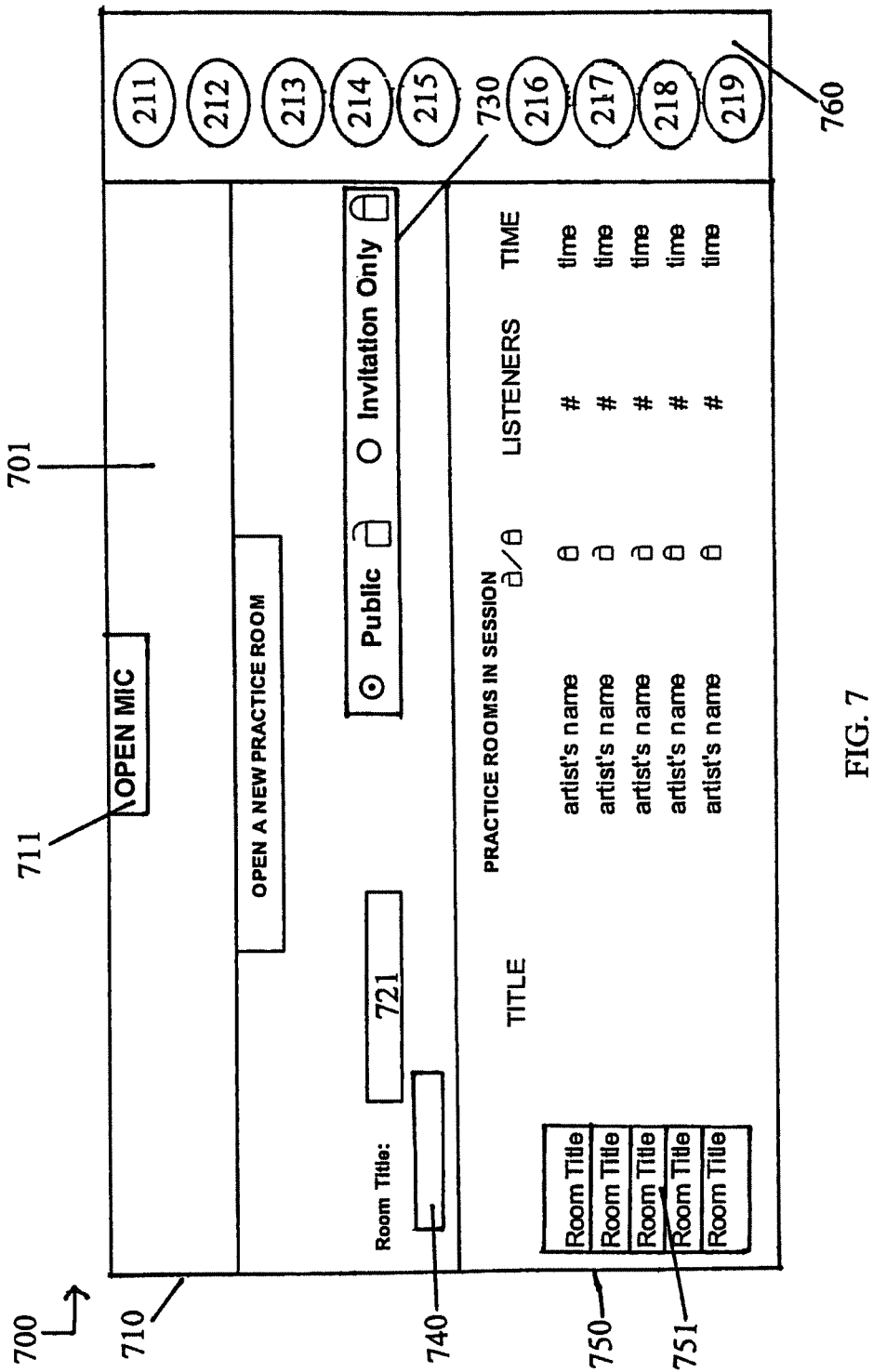
FIG. 7 is a plan view of a display of the music performance venue system of the present invention allowing users to access informal performance areas.
Figure 8:
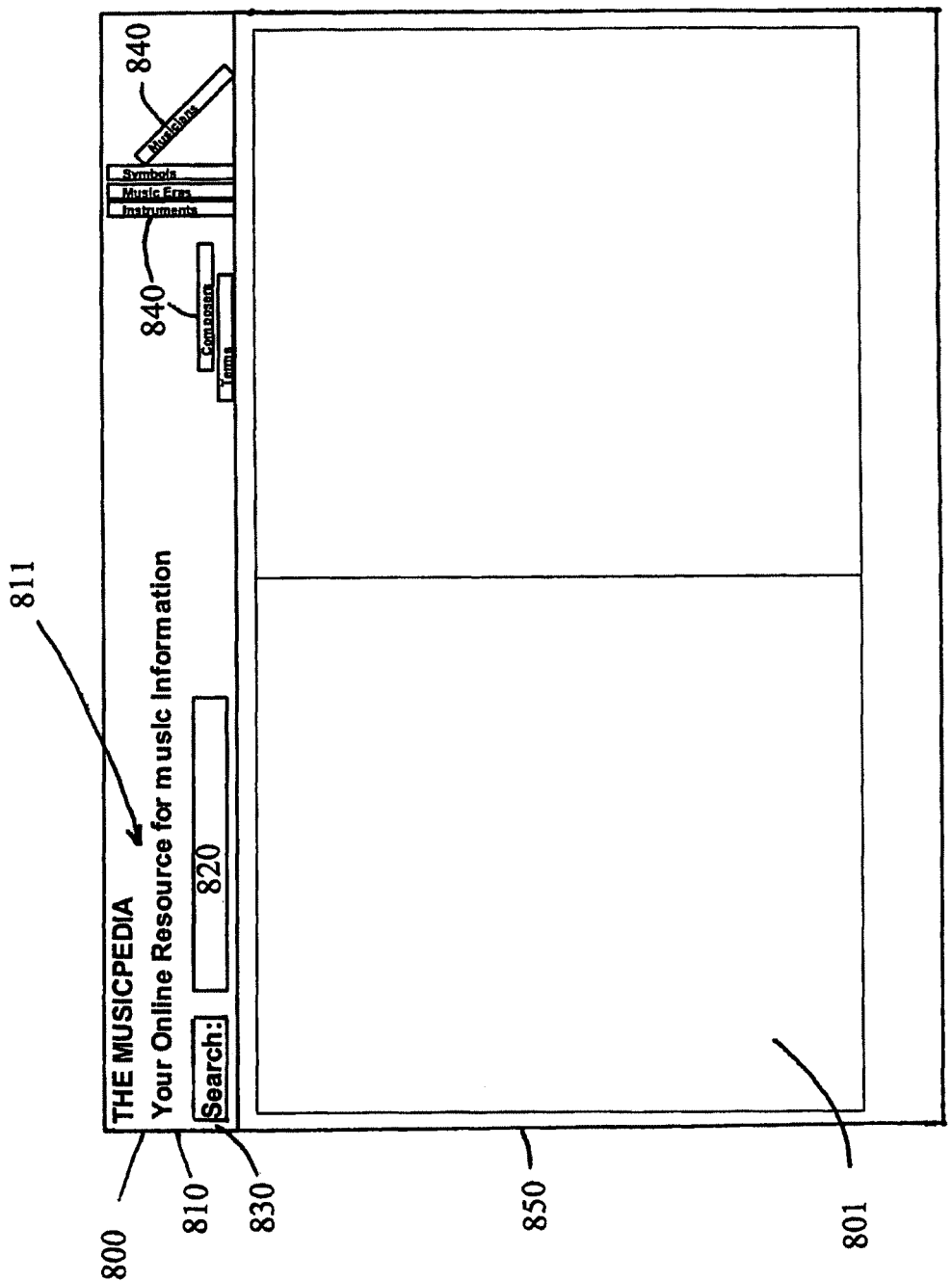
FIG. 8 is a plan view of a display of the music performance venue system of the present invention allowing users to browse and create encyclopedia entries.
Figure 9:
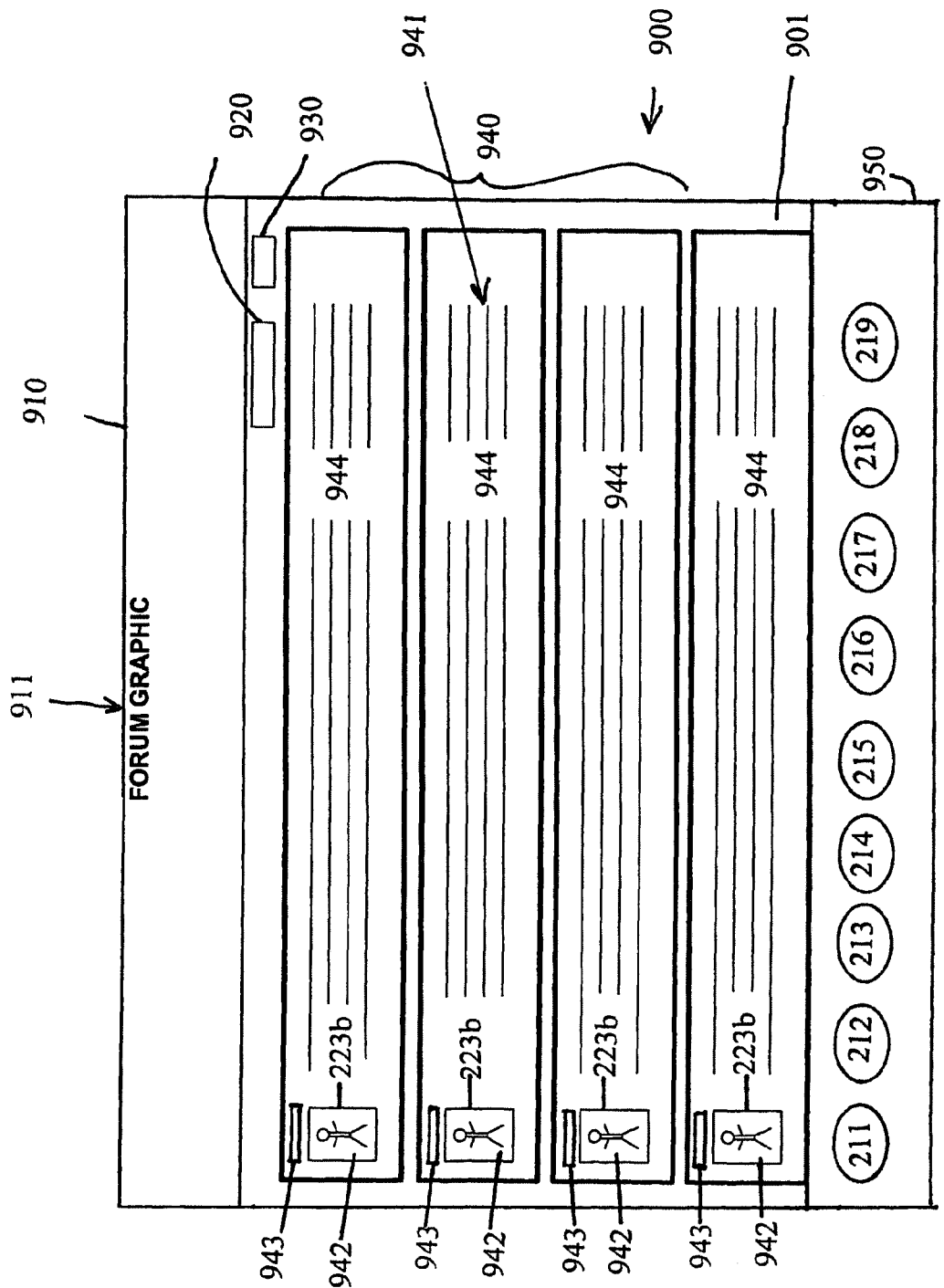
FIG. 9 is a plan view of a display of a discussion forum area of the music performance venue system of the present invention.
Figure 10:
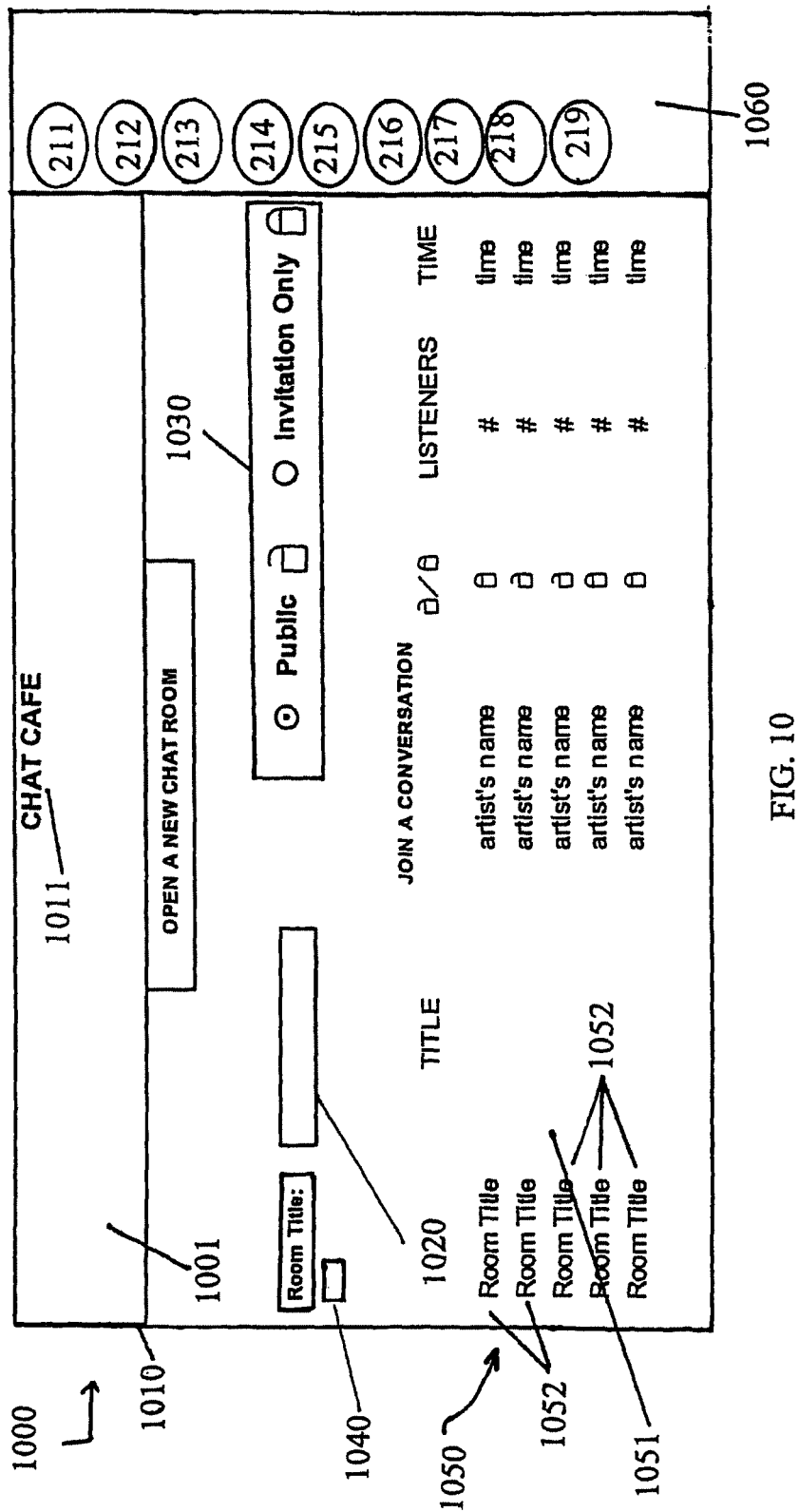
FIG. 10 is a plan view of a display of a chat area of the music performance venue system of the present invention.
Figure 11:
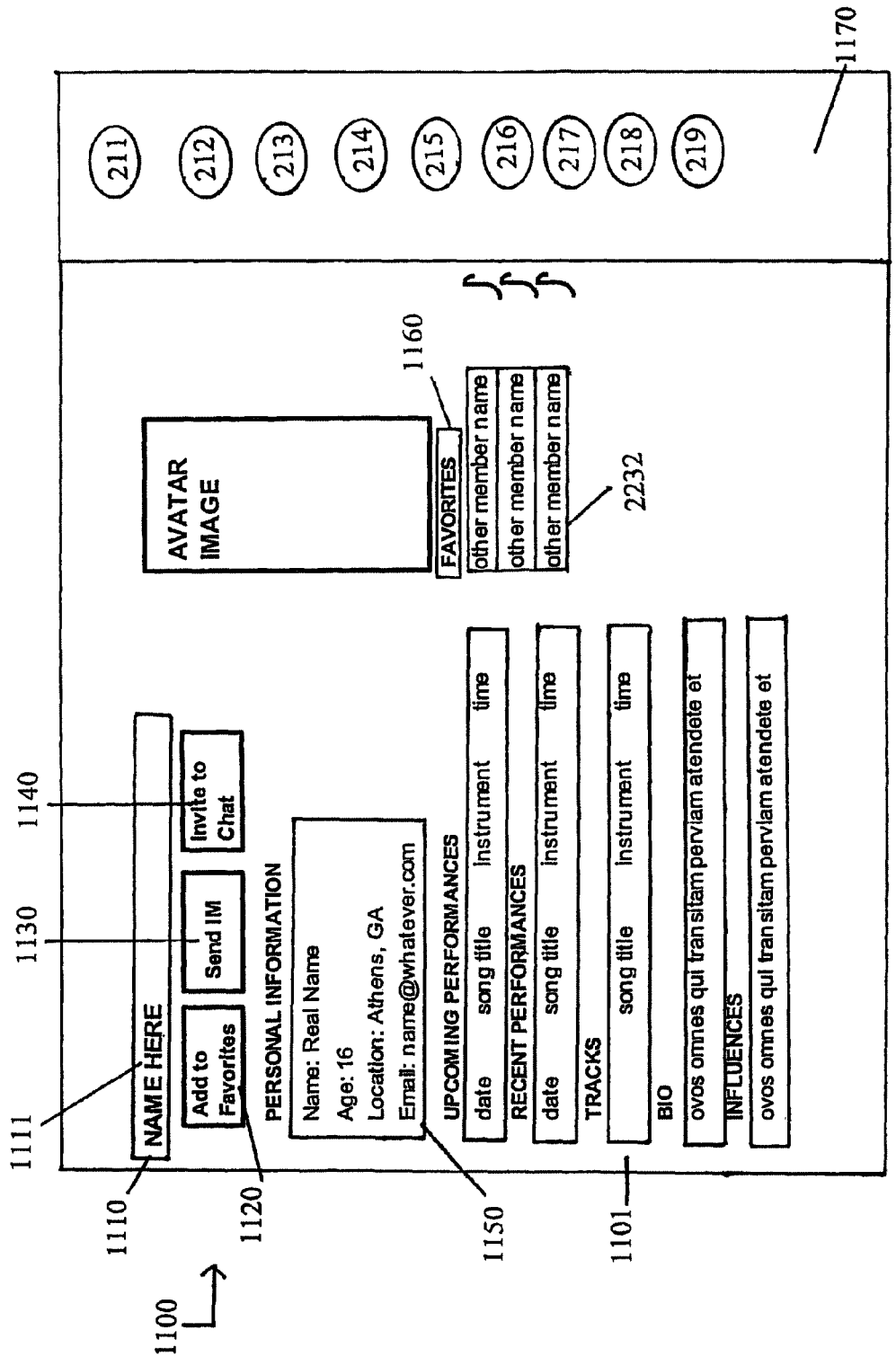
FIG. 11 is a plan view of a display of the music performance venue system of the present invention allowing access to a profile of a user of the system.
Figure 12:
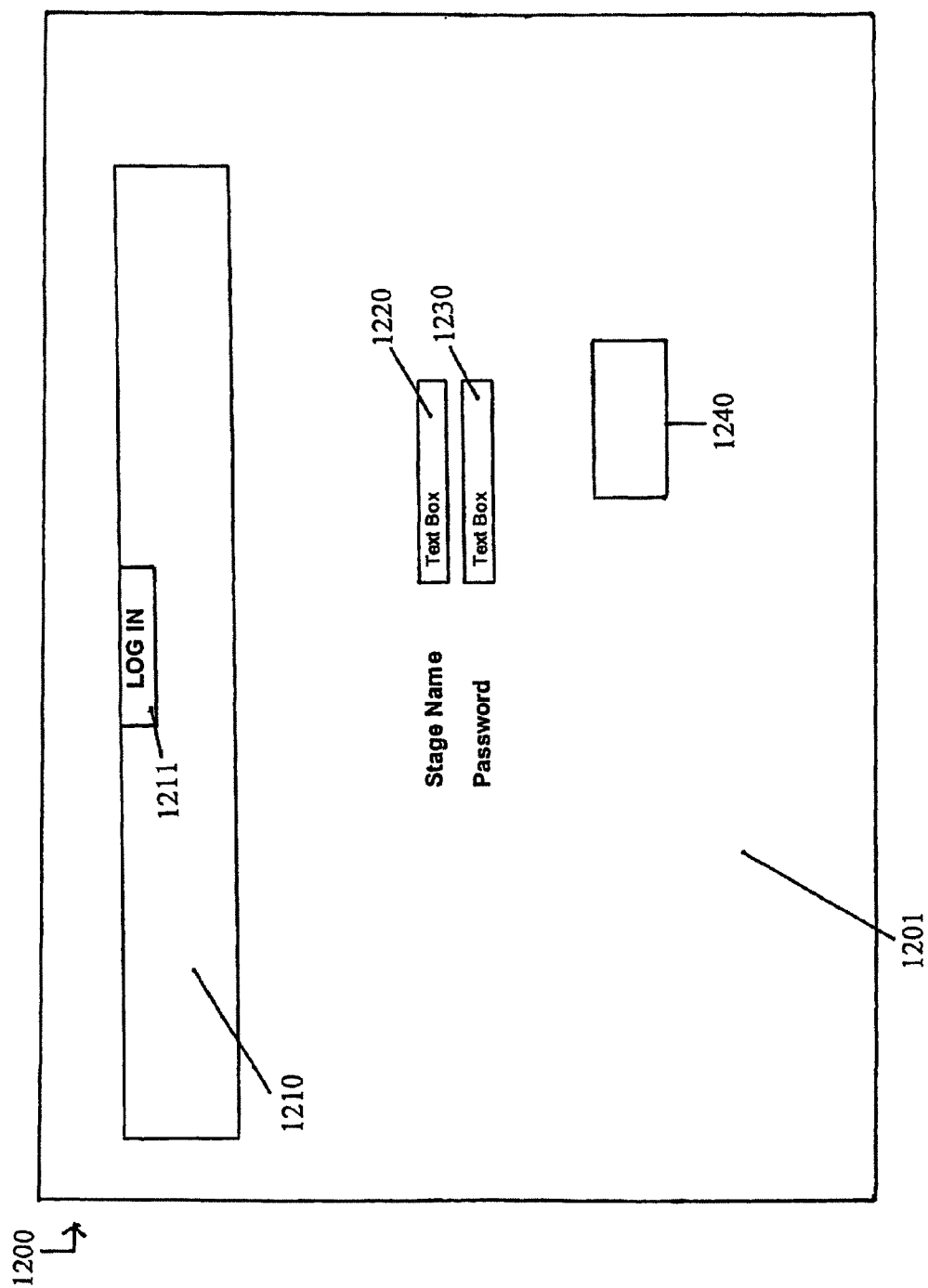
FIG. 12 is a plan view of a display of the music performance venue system of the present invention allowing a user login to the system.
Figure 13:
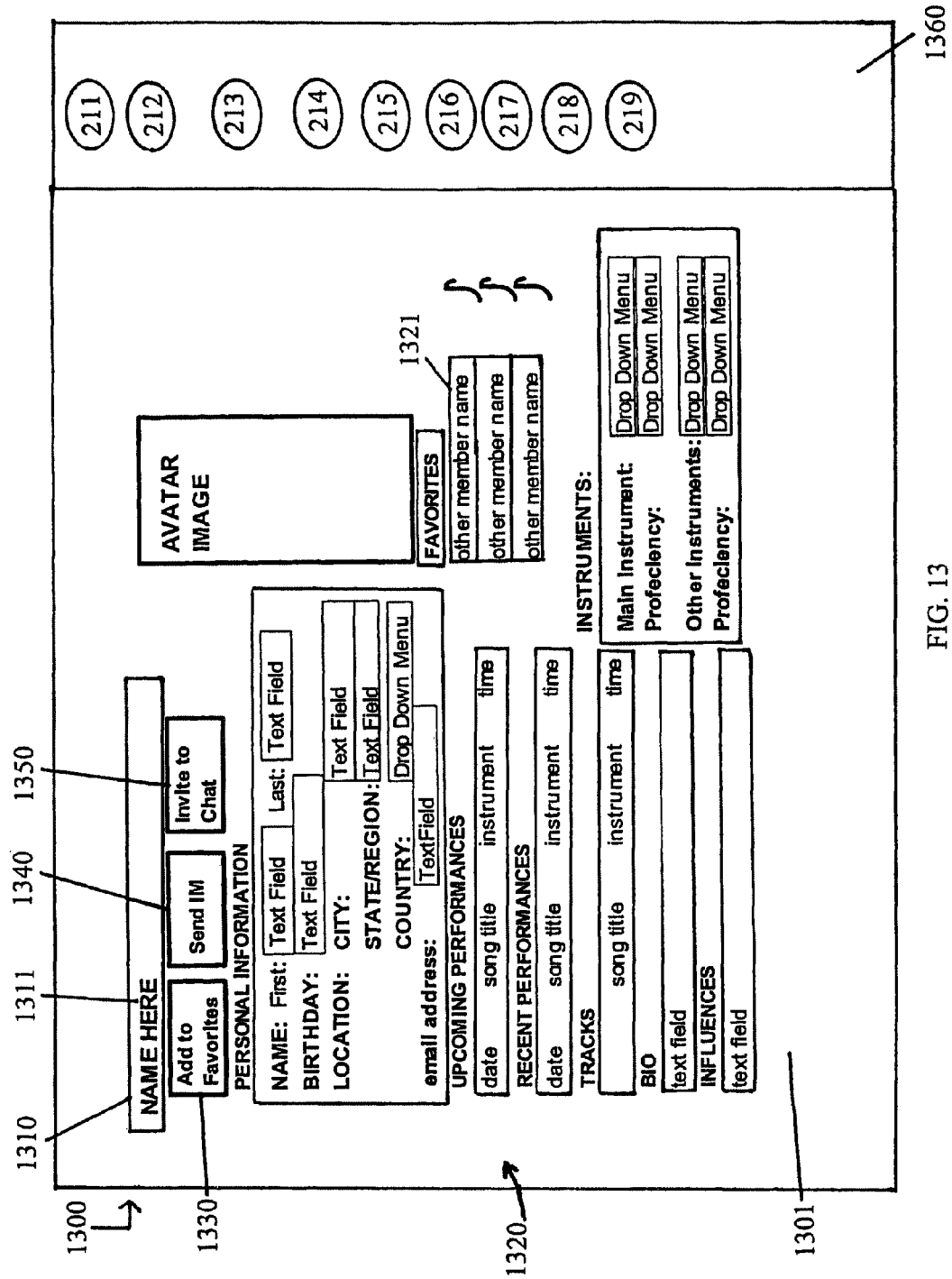
FIG. 13 is a plan view of a display of the music performance venue system of the present invention allowing a user to access to a profile of a user of the system.

Now referring more particularly to FIG. 7, activation of "practice" link 215, preferably formed as a graphic icon, such as a button with "Open Mic" displayed thereon, by user U1 preferably causes user terminal 121 to display "practice" webpage 700. "Practice" webpage 700 preferably includes header 710, entry field 720, entry field 730, submit button 740, information portion 750, and pane 760 having links 211-219, all displayed over background 701. Background 701 is preferably selected to include one or more colors, patterns, images, or the like, optionally including animation, as desired. Header 710 preferably includes title 711, such as a graphic icon, indicating that "practice" webpage 700 is being displayed.

User U1 may preferably create a practice room by entering a room title in entry field 720 such as an alphanumeric title, select a characteristic about the room, such as public or private, using entry field 730, and by submitting such information by activating submit button 740. Upon activation of submit button 740, "practice room" website 1600 is preferably displayed on user terminal 121, and an entry corresponding to the practice room created by user U1 is preferably added to list 751 displayed in information portion 750. Preferably, list 751 contains a list, such as a truncated list or a complete list of created practice rooms, including some or all information pertaining to such rooms. Preferably the title, the user's name, a number of listeners, an age of the practice room, an indication of whether the room is public or private, or the like is included for each practice room in list 751. Thus, user U1 preferably enters a title containing desired information about the practice room, about user U1, or the like such that other users browsing or searching list 751 will be able to better select a practice room to join. If user U1 selects a private room, user U1 may preferably invite other users, either by name, by rating, or by other information.

Activation of "encyclopedia" link 216, preferably formed as a graphic icon, such as a button with "Musicus Pedius" displayed thereon, by user U1 preferably causes user terminal 121 to display "encyclopedia" webpage 800. "Encyclopedia" webpage 800 preferably includes header 810, entry field 820, submit button 830, links 840, and information portion 850, all displayed over background 801. Background 801 is preferably selected to include one or more colors, patterns, images, or the like, optionally including animation, as desired, and is preferably formed as an open book with blank pages. Header 810 preferably includes title 811, such as a graphic icon, indicating that "encyclopedia" webpage 800 is being displayed.

User U1 may preferably enter a word, phrase, name, stage name, genre, song title, date, or the like in entry field 820 and activate submit button 830 to display a list of topics or entries matching the entered word, phrase, or the like, such as in information portion 850. Preferably, each item in the list includes a link which, upon activation, displays the full contents of the selected entry, such as in information portion 850. Preferably, the list may be displayed on a first section of information portion 850, such as a section corresponding to a left-hand page of the open book of background 801, while the full contents of the selected entry may be displayed on a second section of information portion 850, such as a section corresponding to a right-hand page of the open book of background 801. Preferably, activation of a different link of the list displays the full contents associated with the newly selected entry on the second section of information portion 850. Likewise, entry of a new phrase in entry field 820 and activation of submit button 830 preferably displays a new list on the first section of information portion 850.

Alternatively, user U1 may activate one of links 840, preferably formed as icons, such as icons formed as a book, to display a list of topics. For example, one of links 840 may be formed as an icon formed as a book with the word "musicians" on the spine. Activation of such a link preferably displays a list of musicians about whom entries have been created, such as an alphabetical list, a chronological list, a list organized by genre, or the like. Others of links 840 may preferably be forted as books bearing other topics on their spines or covers, such as terms, composers, lyricists, instruments, eras, symbols, or the like.

Thus, user U1 may preferably browse and/or search the encyclopedia to read, see, and/or hear information entered into the encyclopedia. Preferably, such information is entered into the encyclopedia by users. As such, the content of the encyclopedia will preferably grow in volume, and will preferably contain entries of interest to users of system 100. Alternatively, some or all of the information entered in the encyclopedia may be entered by one or more system managers, or by third parties, such as persons paid to generate entries.

Activation of "discussion" link 217, preferably formed as a graphic icon, such as a button with "Forum" displayed thereon, by user U1 preferably causes user terminal 121 to display "discussion" webpage 900. "Discussion" webpage 900 preferably includes header 910, entry field 920, submit button 930, information portion 940, and pane 950 having links 211-219, all displayed over background 901. Background 901 is preferably selected to include one or more colors, patterns, images, or the like, optionally including animation, as desired. Header 910 preferably includes title 911, such as a graphic icon, indicating that "discussion" webpage 900 is being displayed.

Information portion 940 preferably includes list 941 of discussion topics, such as a chronological list arranged according to the most recent post. Each entry in 941 preferably includes avatar 942, such as an avatar of the creator of the topic, or of the most recent contributor to the topic. Each entry in list 941 preferably further includes topic heading 943 and text 944, such as at least a portion of a post under the topic, such as the most recent post. Each of avatars 942, topic heading 943, and text 944 preferably comprises a link. Activation of link 223b associated with avatar 942 preferably displays a "view profile" webpage 1300 of an associated user. Activation of a link associated with topic heading 943 or text 944 preferably displays a complete thread of posts under the topic. Thus, users may create, read, and contribute to threads of posts under a particular selected topic of discussion.

Activation of "chat" link 218, preferably formed as a graphic icon, such as a button with "Chat Cafe" displayed thereon, by user U1 preferably causes user terminal 121 to display "chat" webpage 1000. "Chat" webpage 1000 preferably includes header 1010, entry field 1020, entry field 1030, submit button 1040, information portion 1050, and pane 1060 having links 211-219, all displayed over background 1001. Background 1001 is preferably selected to include one or more colors, patterns, images, or the like, optionally including animation, as desired. Header 1010 preferably includes title 1011, such as a graphic icon, indicating that "chat" webpage 1000 is being displayed.

User U1 may preferably create a new chat room by entering a title in entry field 1020, entering additional information, such as public, private, or the like, about the room to be created in entry field 1030, and activating submit button 1040. Upon submission, an entry corresponding to the newly created room is added to list 1051 of currently available chat rooms displayed in information portion 1050. Preferably, list 1051 includes information about each available room, such as a title of the room, the name or other information about the creator of the room, an indication of whether the room is public or private, the number of users in the room, an age of the room, or the like, and a link 1052 associated therewith. Activation of one of links 1052 preferably displays a corresponding chat room (not shown) whereby users may discuss, either through voice or text chat, various topics. In many respects, "chat" webpage 1000 is preferably similar to "practice" webpage 700, and the chat rooms (not shown) are preferably similar to practice room 1600, with the exception that the chat room does not have the music performance functionality of practice room 1600.

Activation of "manage profile" link 219, preferably formed as a graphic icon, such as a button with "Manage Profile" displayed thereon, by user U1 preferably causes user terminal 121 to display "manage profile" webpage 1100. "Manage profile" webpage 1100 preferably includes header 1110, message link 1120, edit profile link 1130, edit avatar link 1140, information portion 1150, edit friends link 1160, and pane 1170 having links 211-219, all displayed over background 1101. Background 1101 is preferably selected to include one or more colors, patterns, images, or the like, optionally including animation, as desired. Header 1110 preferably includes title 1111, such as a graphic icon, indicating that "manage profile" webpage 1100 is being displayed.

Activation of message link 1120 by user U1 preferably displays messages sent to user U1 by other users of system 100 and preferably allow user U1 to respond thereto and/or create new messages to other users. Activation of "edit friends" link 1160 preferably displays a "friends management" webpage (not shown) whereby user U1 may preferably add and remove stage names of friends. Those users whose stage names are included in the friends list preferably appear on the "manage profile" webpage, such as in the form of hypertext links 223a, such that user U1 may quickly access a respective "view profile" page for the friend.

Information portion 1150 preferably includes a display of all of the information stored on server 110 about user U1 in association with the user's account, whereby user U1 may easily view what information is stored, and identify when such information needs to be updated or otherwise altered. For example, a user's real name, age, address, email address, personal website, preferred instrument(s), biography, musical influences, or the like may be stored on server 110, such as during a sign-up process. Additionally, information portion 1150 preferably includes information about the user's activity within system 100, such as upcoming scheduled performances, saved recordings, any ratings associated therewith, the user's current rank, a display of achievements or points accumulated through system 100, or the like. Finally, the user's current avatar is preferably displayed whereby user U1 may preferably decide whether to edit same. Some or all of the information may preferably be formed as a hypertext link, whereby activation of the link will display a list of other users whose profile pages contain the same piece of information. For example, each of the musician and/or band names included in the user's influences list is preferably formed as a link whereby activation of one of the links displays a list of other users who have named the same musician and/or band as an influence. Thus, the links of the profile page preferably foster community by allowing users to easily find and contact other users who have similar taste, style, preferences, or the like, or who are the same age, live in the same area, have the same rank, have the same friends, have listened to the user's performances, ranked the user's performances highly, or the like.

In order to change any of the information displayed on information portion 1150, user U1 preferably activates edit profile link 1130, whereby "edit profile" webpage 1700 is preferably displayed. "Edit profile" webpage 1700 preferably includes entry fields 1710 corresponding to a respective piece of information, such as a drop-down menu, a text box, or the like. Additionally, each entry field 1710 includes a toggle whereby user U1 may preferably show or hide the information entered in the corresponding entry field 1710.

In order to change the user's avatar, user U1 preferably activates edit avatar link 1140, whereby "edit avatar" webpage 1800 is preferably displayed. "Edit avatar" webpage 1800 preferably includes avatar view portion 1810, physical appearance editor portion 1820, clothing editor portion 1830, store portion 1840, and buttons 1850. Avatar view portion 1810 preferably displays a preview of what the user's avatar will look like if changes are accepted. Physical appearance editor portion 1820 preferably includes selections for eye color, skin color, lip color, cheek color, make-up, hair color, eye shape, lip shape, hair style, and the like. Each selection is preferably formed as an icon, activation of which preferably causes avatar view portion 1810 to display the user's avatar with the selected icon incorporated. Clothing editor portion 1830 preferably likewise includes a plurality of icons representing various articles of clothing. Activation of any of the icons preferably causes avatar view portion 1810 to display the user's avatar including the selected article of clothing. Alternatively, user U1 may preferably drag clothing articles to avatar view portion 1810 to cause display of same. Additional or alternative articles of clothing and/or physical appearance options may be purchased by activating a "buy new styles" link of store portion 1840, which preferably displays "store" webpage 1900.

"Store" webpage 1900 preferably includes header 1910, links 1920, inventory portion 1930, detail portion 1940, and buy button 1950. Inventory portion 1930 preferably comprises a plurality of icons. All icons are preferably associated with a particular rank, whereby a user may only gain access to items associated with a particular rank after having achieved the rank, such as by use of system 100. Icons are preferably accessed by activating a selected link of links 1920. Alternatively, icons may be accessed according to price. Each icon is preferably formed as a link, activation of which preferably causes details pertaining to the selected icon to be displayed in display portion 1940, such as a price in currency, or in accumulated points, a time of availability, a number of items in stock, or the like. Activation of buy button 1950 preferably adds the selected icon to the user's wardrobe, i.e. it will appear in clothing editor portion 1830, if the user has sufficient credits (i.e. money or points) to purchase the item, at which time a corresponding amount of credits will be deducted from the balance associated with the user's account.

Activation of "login" link 221, preferably formed as a graphic icon, such as a button with "Login" displayed thereon or a musical instrument displayed over background 201, by user U1 preferably causes user terminal 121 to display "login" webpage 1200. "Login" webpage 1200 preferably includes header 1210, entry field 1220, entry field 1230, and submit button 1240, all displayed over background 1201. Background 1201 is preferably selected to include one or more colors, patterns, images, or the like, optionally including animation, as desired. Header 1210 preferably includes title 1211, such as a graphic icon, indicating that "login" webpage 1200 is being displayed.

User U1 may preferably enter a stage name in entry field 1220 and a password in entry field 1230. Upon activation of submit button 1240 the stage name and password entered in entry fields 1220 and 1230 are preferably compared to information stored on server 110, such as a database of account information. If the entered information matches information corresponding to an account stored on server 110, user U1 is preferably authenticated to the server, mainpage 200 is preferably displayed, or another webpage may be displayed if such preference is saved in the user's account information, whereby user U1 may preferably access otherwise restricted portions of system 100, whereby the user will be identified throughout system 100, such as through the user's avatar, stage name, or both appearing in chat rooms, discussion boards, performance rooms, practice rooms, or the like of system 100, and whereby user U1 will preferably be awarded for activities conducted on system 100 while logged in.

Activation of "view profile" link 223, preferably formed as a graphic icon or a hypertext link, by user U1 preferably causes user terminal 121 to display "view profile" webpage 1300. "View profile" webpage 1300 preferably includes header 1310, information portion 1320, friend link 1330, message link 1340, chat link 1350, and pane 1360 having links 211-219, all displayed over background 1301. Background 1301 is preferably selected to include one or more colors, patterns, images, or the like, optionally including animation, as desired, such as by a user whose profile is displayed. Header 1310 preferably includes title 1311, such as a graphic icon or text, indicating the stage name of user U2, whose information is displayed on "view profile" webpage 1300.

Information portion 1320 preferably includes a display of all information entered by user U2, such as during a sign-up process or during a profile editing process, and marked as public or otherwise selected to be displayed. Thus, activation of "view profile" link 223, in any form or location, preferably allows user U1 to view whatever information user U2 desires of the profile of user U2, whereby user's may learn more about other users of system 100. User U1 may preferably activate friend link 1330 if user U1 wants user U2 to be listed in friend section 1321 of user U1's own "view profile" webpage 1300 when accessed by others. Additionally, if user U1 want to communicate directly with user U2, such as to discuss music, set up a performance together, or the like, user U1 may preferably activate message link 1340 to send user U2 an instant message, send user U2 an email, or the like. If user U1 wants to invite user U2 to a chat room, user U1 may preferably activate chat link 1350.

Figure 14:
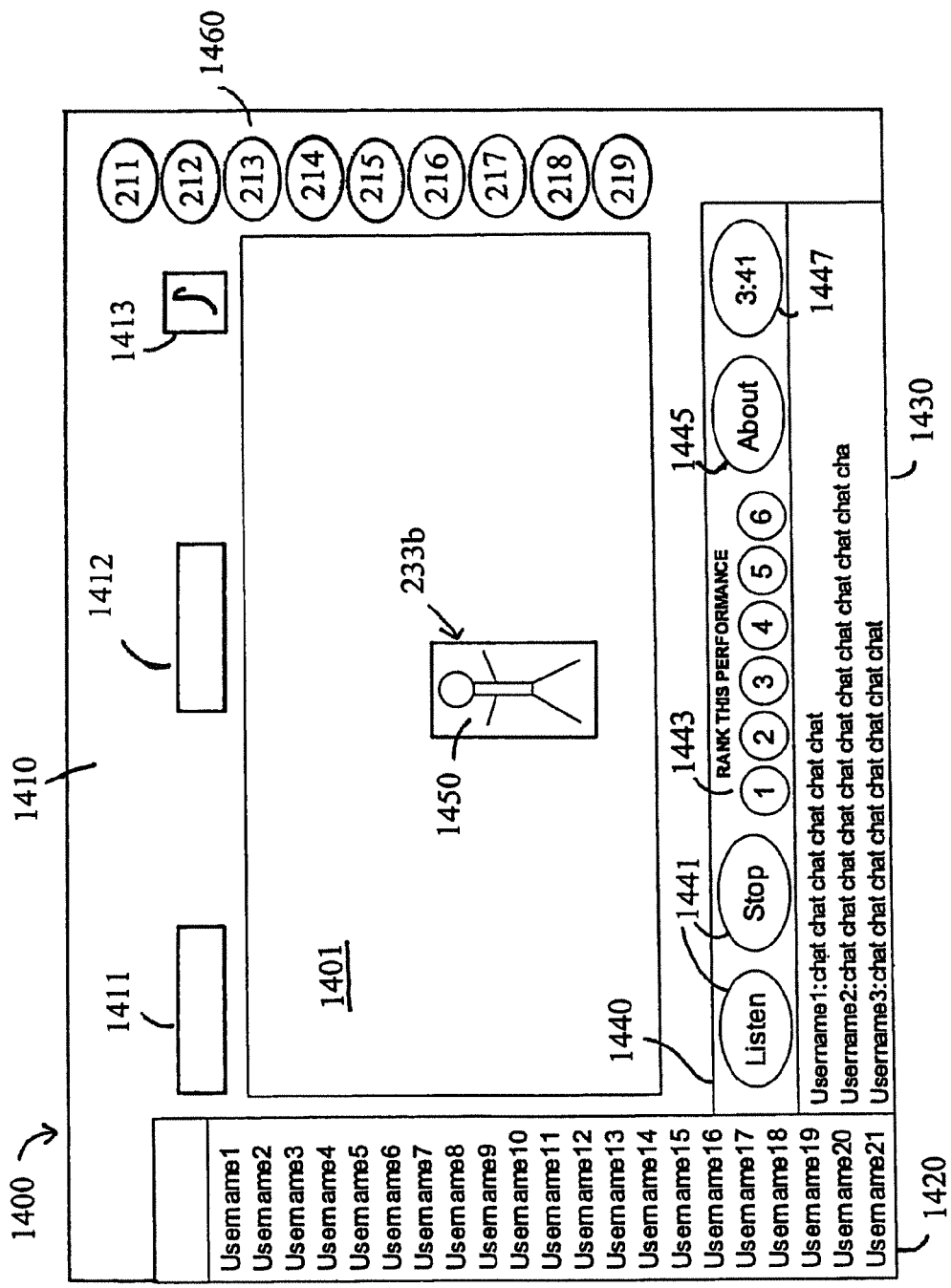
FIG. 14 is a plan view of a display of the music performance venue system of the present invention allowing a user to participate as an audience member of a performance.
Figure 15:
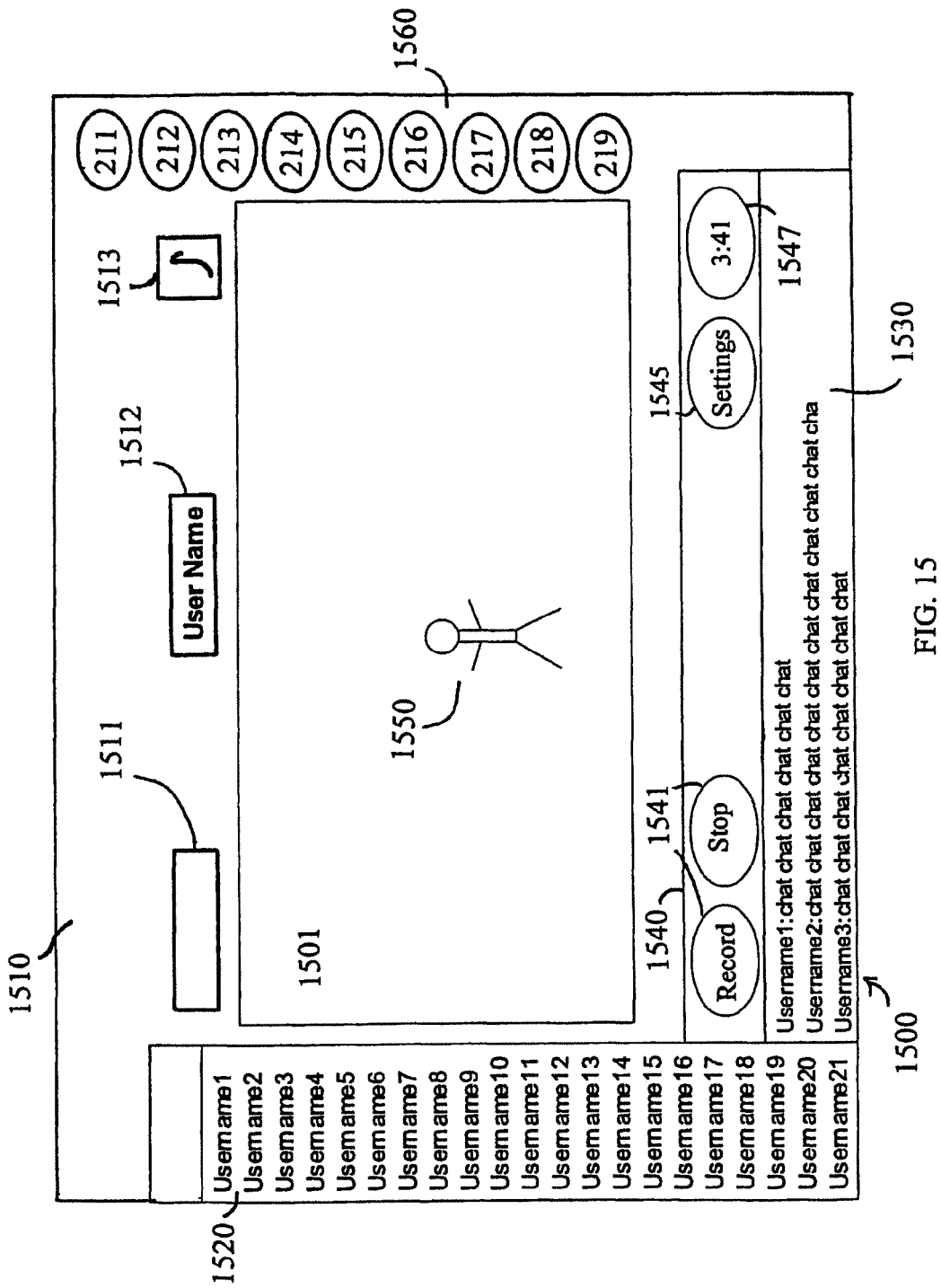
FIG. 15 is a plan view of a display of the music performance venue system of the present invention allowing a user to give a formal performance that may be rated by other users.
Figure 16:
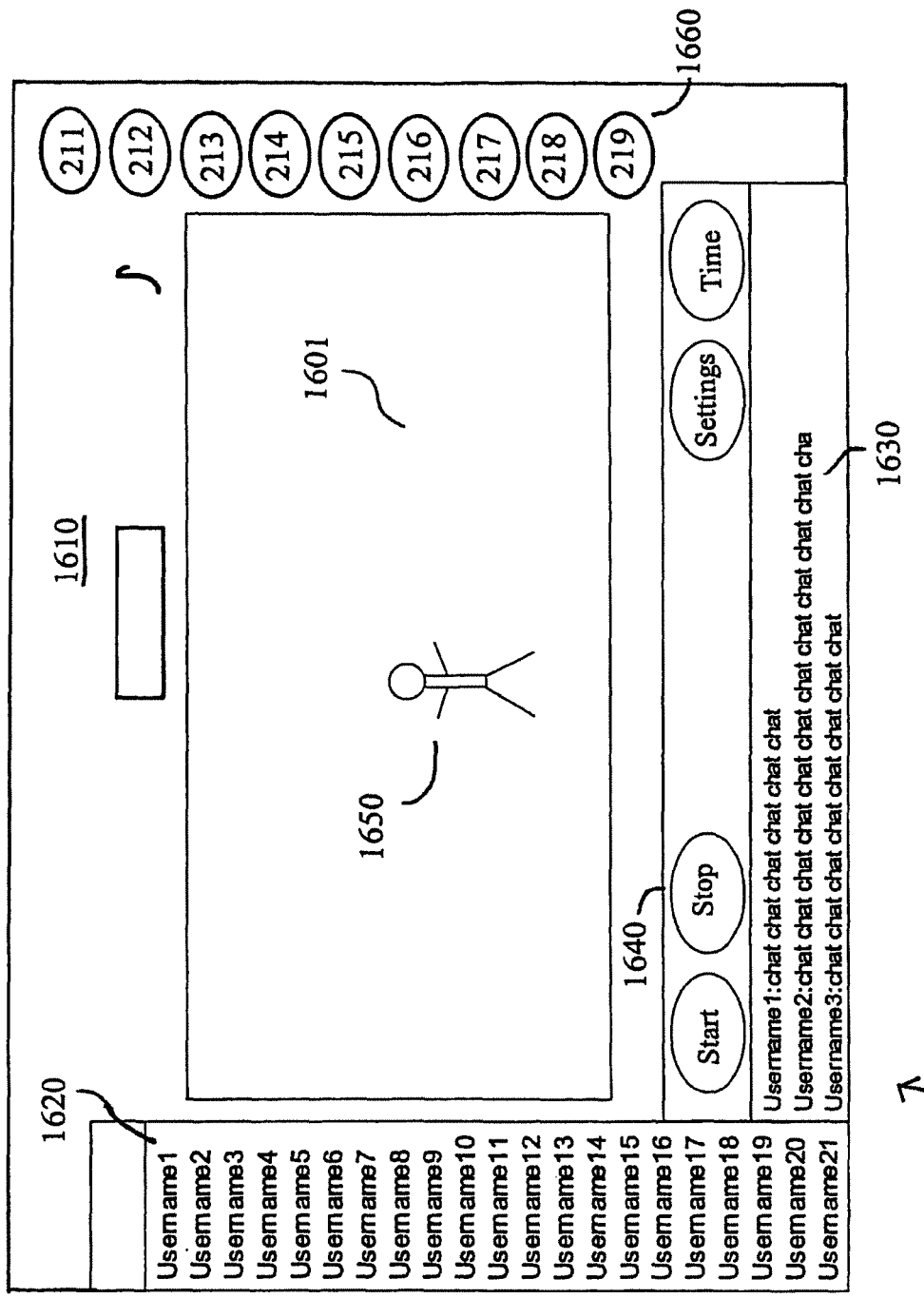
FIG. 16 is a plan view of a display of the music performance venue system of the present invention allowing one or more users to give an informal performance or practice.
Figure 17:
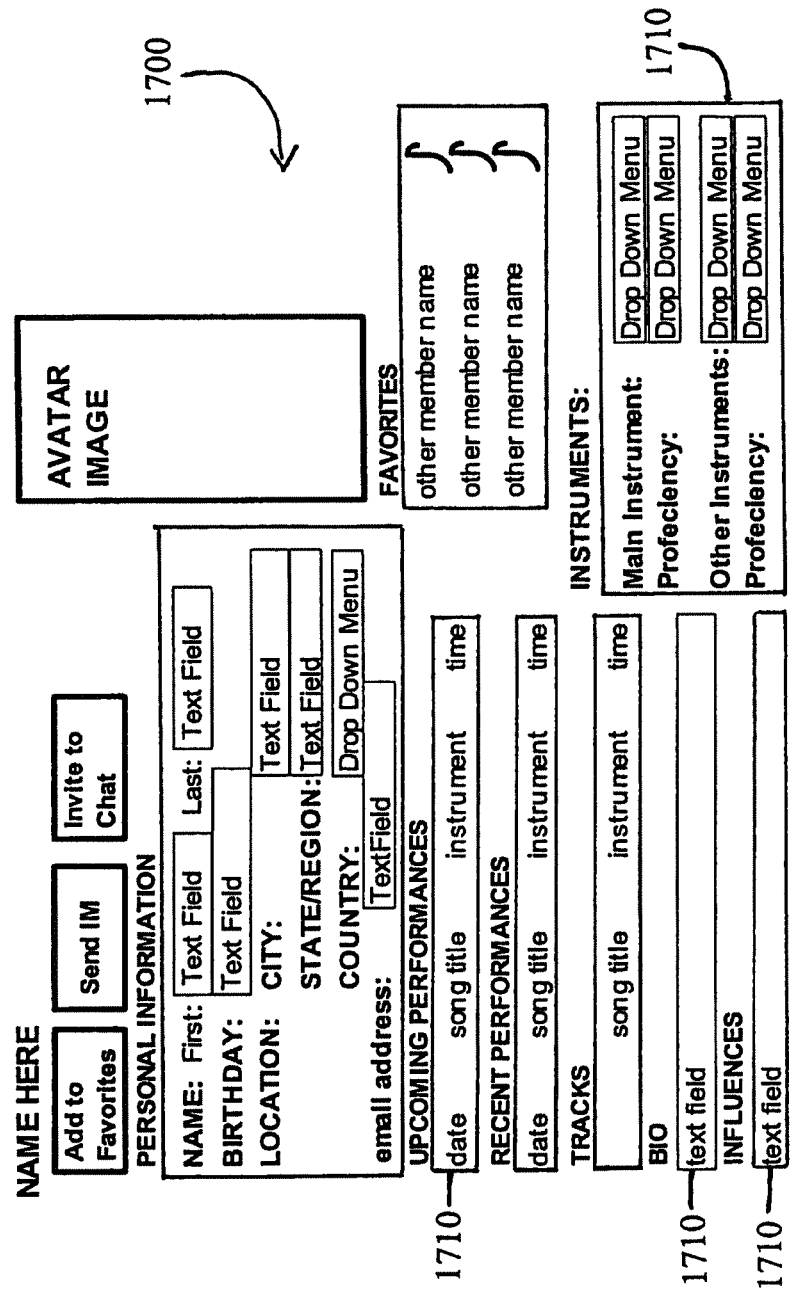
FIG. 17 is a plan view of a display of the music performance venue system of the present invention allowing a user to edit their profile.
Figure 18:
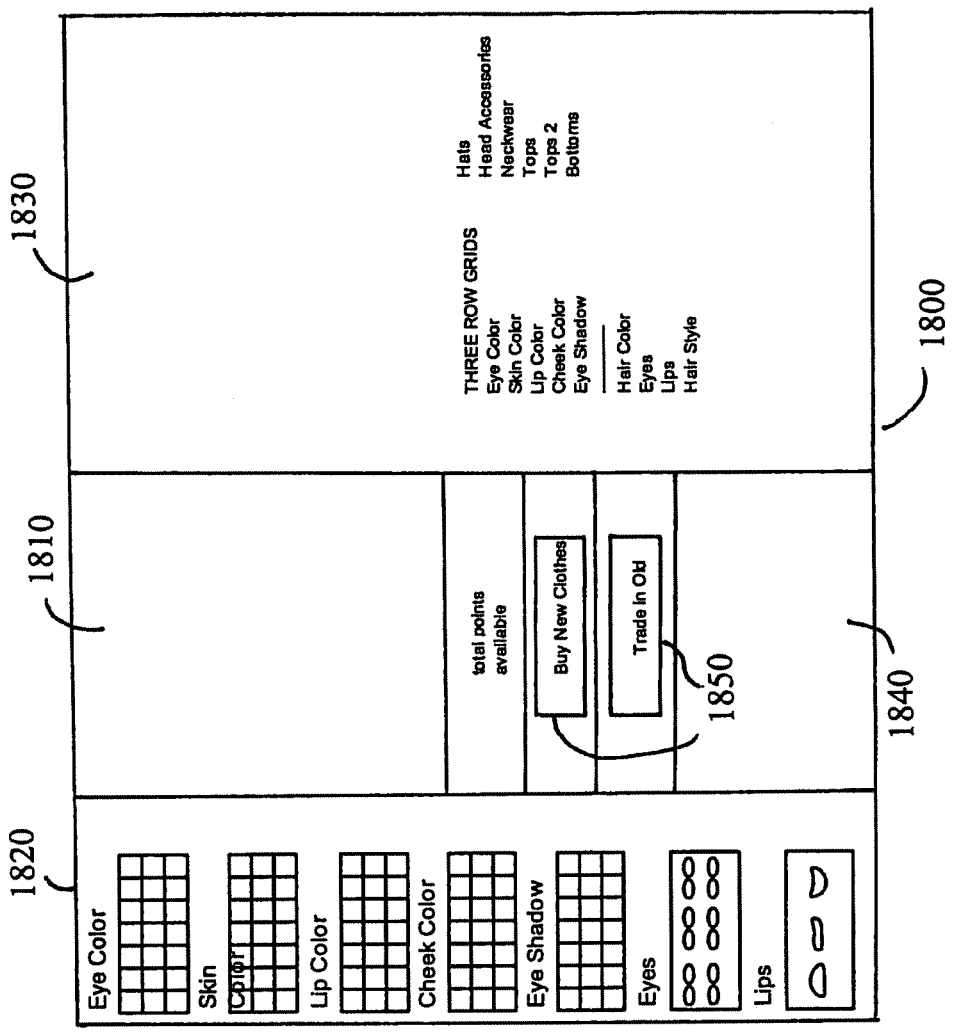
FIG. 18 is a plan view of a display of the music performance venue system of the present invention allowing a user to edit an avatar of their profile.
Figure 19:
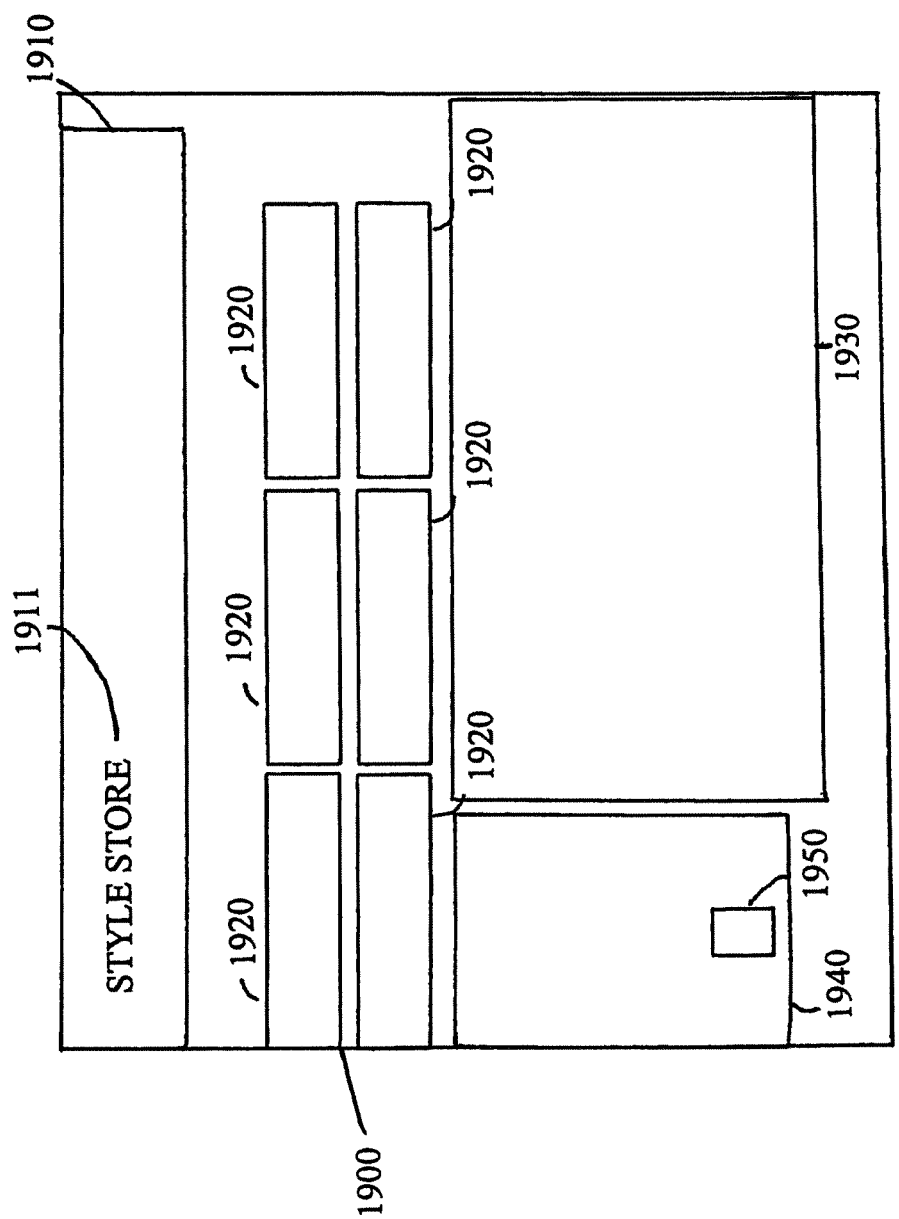
FIG. 19 is a plan view of a display of a store of the music performance venue system of the present invention.

Now referring more particularly to FIG. 14, "playback" webpage 1400 preferably includes header 1410, audience pane 1420, chat pane 1430, control bar 1440, avatar 1450, and navigation pane 1460 having links 211-219, all displayed over background 1401. Background 1401 is preferably selected to include one or more colors, patterns, images, or the like, optionally including animation, as desired, and is preferably formed as a stage. Header 1410 preferably includes song title 1411, user stage name 1412 of the performing user, and rank indication 1413, such as a symbol or text indicating the current rank held by the performing user. Audience pane 1420 preferably includes a list of stage names of users who are visiting "playback" webpage 1400. Chat pane 1430 preferably allows each of the users visiting "playback" webpage 1400 to read and write text chat, or to speak and hear voice chat, whereby users may, for example, discuss a performance being played.

Control bar 1440 preferably allows user U1 to start and stop receiving a streaming broadcast of a performance, either live or recorded, using buttons 1441. If the performance is live, and user U1 joins "playback" webpage after the beginning of the performance, user U1 may preferably still listen to the performance, either from the beginning or picking up in the middle. After listening for a predetermined amount of time, such as a minute or thirty seconds, user U1 may preferably rate the performance using scale 1443, such as on a 1-6 scale.

Such rating preferably is recorded and averaged with other users who rated the performance to determine an overall rating for the performance, which may determine, at least ion part, its place in "ratings" webpage 500, and may determine, at least in part, how many points are earned by the performing user. Additionally, control bar 1440 preferably includes about link 1445 that displays additional information about the performance. Finally, timer 1447 preferably displays a running time of the performance. Avatar 1450 is preferably displayed over background 1401 such that avatar 1450 appears as though it is on-stage. Avatar 1450 is preferably the avatar of the performing user, and preferably functions as graphic link 233*b* to "view profile" webpage 1300.

While user U1, and other users in the audience, preferably sees "playback" website 1400, user U2 who is performing preferably sees "performance hall" website 1500. "Performance hall" website 1500 preferably includes header 1510, audience pane 1520, chat pane 1530, control bar 1540, avatar 1550, and navigation pane 1560 having links 211-219, all displayed over background 1501. Background 1501 is preferably selected to include one or more colors, patterns, images, or the like, optionally including animation, as desired, and is preferably formed as a stage. Header 1510 preferably includes song title 1511, user stage name 1512 of the user U2, and rank indication 1513, such as a symbol or text indicating the current rank held by user U2. Audience pane 1520 preferably includes a list of stage names of users who are visiting "playback" webpage 1400. Chat pane 1530 preferably allows user U2 to chat with users visiting "playback" website 1400.

Control bar 1540 preferably allows user U2 to start and stop recording a streaming broadcast of a performance, either live or recorded, using buttons 1541. Additionally, control bar 1540 preferably includes settings link 1545 that allows user U2 to configure "performance hall" website 1500, such as to accommodate the user's connection speed, or the like. Finally, timer 1547 preferably displays a running time of the performance. Avatar 1550 of user U2 is preferably displayed over background 1501 such that avatar 1550 appears as though it is on-stage.

As discussed above, "practice room" website 1600 may be used as an alternative performance portion of system 100 to "performance hall" website 1500, and is preferably accessed via "practice" website 700. Preferably, "practice room" website 1600 is similar to "performance hall" website 1500, and preferably includes header 1610, audience pane 1620, chat pane 1630, control bar 1640, avatar 1650, and navigation pane 1660 having links 211-219, all displayed over background 1601. Background 1601 is preferably selected to include one or more colors, patterns, images, or the like, optionally including animation, as desired, and is preferably formed as a stage. In the case of "practice room" website 1600, however, each user in the practice room preferably has "practice room" website 1600 displayed on a corresponding user terminal. Accordingly, each user present in the practice room preferably has the ability to begin a streaming transmission to the other attendees via control bar 1640. Thus, "practice room" website 1600 may preferably be used as an "open-mic" style performance venue. Preferably more than one user may begin such a streaming transmission at the same time, such that one or more users may perform at the same time. Alternatively, performance may be restricted to a single user at a time, and different users may play sequentially. Communication, such as through chatting, is preferably enabled at all times, and is preferably open to all users visiting "practice room" website 1600.

In use, system 100 is preferably used to create musical performances by capturing music data at user terminal 121, transmitting such music data to server 110, and transmitting the music data to an audience member via user terminal 123. The music data may be stored, permanently or temporarily, on server 110, and/or on user terminal 123. In addition, system 100 may enable manipulation of the music data at user terminal 121, server 110, and/or user terminal 123. Such manipulation may take the form of adding music data thereto, deleting some or all music data therefrom, and/or modifying some or all music data. Thus, such modification may take place, for example, after capture thereof and before transmission to server 110, after transmission to server 110 and before transmission to user terminal 123, and/or after transmission to user terminal 123.

A preferred method of creating a musical performance using system 100 includes user U1 capturing music data, transmitting the music data to server 110, transmitting the music data to user U2, manipulating the music data by adding additional music data, and transmitting the manipulated music data to server 110 for transmission to one or more additional users comprising an audience. Preferably the above steps take place simultaneously, or nearly so, such that users U1 and U2 preferably create a finished collaborative performance almost in real-time for immediate performance to an audience of users.

Users U1 and U2, among others, may preferably schedule a performance in advance, promote such performance via message boards, email, instant messages, chat rooms, banners, or the like of system 100, and/or other means outside system 100 to generate interest in the performance. Users U1 and U2 may then preferably sell or otherwise distribute tickets, invitations, or the like to users interested in participating as an audience member of such performance. Thus, system 100 preferably includes sufficient options for performance to mimic conventional brick-and-mortar performance venues, with or without additional audio and/or video recording and/or broadcasting of the performance, as well as to enable unique performance venues, such as virtual practice rooms and performance halls whereby users from around the world may create and distribute musical performances.

Alternatively, two or more users may congregate at user terminal 121, or the like, and capture music data corresponding to an ensemble performance for subsequent distribution through system 100, with or without modification, either live or available at a later time. Such distribution, like distribution of all performances via system 100, may preferably be accomplished through a restricted streaming data feed whereby saving and/or modifying the data stream is prevented by system 100. Alternatively, such distribution may preferably be accomplished through an unrestricted streaming data feed, whereby users comprising an audience may save, modify, reproduce, remake, or otherwise use such music data as they wish.

To facilitate such distribution, system 100 preferably includes licensing information corresponding to each performance associated therewith, whereby the licensing information preferably creates criteria for restricting or allowing access, use, modification, transmission, or the like of a particular performance by a particular user base on licensing information associate with the particular user's profile or account.

As an example, user U1 may preferably create a practice room, such as by user of "practice" webpage 700, whereby user U1 may preferably give an informal performance using a selected instrument therein. Preferably one or more other users, such as users U2 and U3, may preferably join the practice room, such as by accepting an invitation, by searching for a practice room, or the like. Once inside, users U1, U2, and U3 may preferably all discuss desired topics, such as via text chat within "practice" webpage 700. Preferably users U2 and U3 may preferably provide feedback, comment, suggestions, encouragement, or the like. Furthermore, users U2 and U3 may preferably likewise give an informal performance using a selected instrument in order to solicit advice, comment, suggestion, instruction, or the like, or to illustrate a comment, suggestion, instruction, or the like. Thus, users U1, U2, and U3, among others, may meet, perform and interact, whereby each may preferably learn and grow as a musician. If desired, users U1, U2, and U3 may agree to form a band, based on hearing each other perform or based on any other criteria, wherein users U1, U2, and U3 may preferably practice and give ensemble performances.

Such an ensemble performance may be given by creating a performance hall, such as by scheduling a performance using performance webpage 600. At the scheduled time, or preferably before, users U1, U2, and U3 may preferably join the performance hall and setup their respective user terminals and/or system 100 for optimal or better sound quality or the like. Users U1, U2, and U3 may preferably communicate via chat or the like to facilitate such setup, or to discuss the upcoming performance or the like. Numerous additional users may preferably join the performance hall as audience members and may preferably communicate with other audience members, and/or the users U1, U2, and U3, such as via the chat feature. Preferably, at the scheduled performance time the performance may begin. The performance may be given, for example, by user U1 beginning to play music, thereby causing the transmission of data corresponding to such performance to be transmitted to user U2 either directly or via server 110. User U2 may then preferably begin playing along with the performance of user U1, preferably in substantially real-time, i.e. with very little delay or with as little delay as possible. User U3 may preferably receive the compilation, again either directly or via server 110, and play along with the joint or compilation performance of users U1 and U2, again preferably in substantially real-time. Upon completion of each respective contribution of users U1, U2, and U3, and more preferable upon completion of the contribution from user U3 (or the last performer/contributor), the finished ensemble is preferably routed through server 110, whereupon users/audience members may listen, vote, rank, provide feedback, and the like, as provided via the utilities described supra.

That is, the users in the audience may preferably continue chatting, and may preferably provide feedback, comment, discussion, or the like relating to the performance of users U1, U2, and U3. After a predetermined amount of time, such as thirty seconds of the performance, users in the audience may rate the performance. Such rating may be adjustable throughout the remainder of the performance, and preferably for a limited time thereafter, whereby users in the audience may reflect and consider the rating they give to the performance, taking into account the ongoing discussion (and/or rating) amongst the other users/audience members. Preferably a log of all such discussion, whether by performers or by audience members, is saved in a log and is accessible by the performing users, at least for a period of time after the performance is completed, whereby each performer may review the comments and feedback provided during the performance, and preferably for some time thereafter.

Such a live performance, given by a group or by an individual, may preferably additionally be recorded on server 110 for subsequent access by the performer, by audience members, or by any other user of system 100. Alternatively, a user, or group of users, may decide to forego a live performance, such as when scheduling a convenient time is difficult. In such a case, a first user may preferably create a performance hall, again such as by using "performance" website 700, go through the setup procedure, and begin recording a performance. System 100 preferably stores such recording, such as on server 110 for later access by other users. If a band or group is creating the recording, the first user's performance is preferably available for streaming download by a second user, whereby the second user may preferably play along with the recorded performance of the first user, thereby creating a joint or ensemble performance. Such ensemble performance is preferably likewise recorded and saved by system 100. A third user may preferably access, playback, and play along with the recorded ensemble performance, thereby creating a new recording with all three users playing together. Additional users may continue to playback and play along with the recordings until the performance is complete. In one embodiment, the recording users may limit access to the recorded performance such that only selected users may access and add to the performance. Preferably, access is automatically limited by a user's affiliation with a particular group or band, such as in the user's profile. As such, only band members may access, listen to, modify, or add to the performance. Preferably, at any time the performance may be completed, thereby removing the band member restriction on the performance.

System 100 may include additional features as will be understood by those ordinarily skilled in the art. For example, system 100 preferably further includes a mentor system, whereby highly rated users, volunteer users, or the like may be listed, or otherwise indicated, as mentors. Thus, a user may preferably contact a mentor via email, chat, or the like to ask questions about system 100, about music, or the like.

Preferably, a user may receive instruction, from a mentor or any other user, in various ways. A user may receive instruction by researching a selected topic using the encyclopedia, by reading the webpages or discussion postings of other users. A user may additionally create discussion postings asking a question whereby other users may provide instructional responses. Similarly, users may take advantage of chat rooms to pose questions, provide answers, and generally discuss all aspects of the system and of music. In one embodiment, special dedicated channels, chat rooms, bulletin boards, or the like, are provided for questions and answers, and may be topic specific, such as a chat room dedicated to discussion of blues topics, or for questions about chord progressions.

As will be understood by those ordinarily skilled in the art after appreciation of the within disclosures, system 100 may be implemented in formats other than a website with linked webpages, such as in a locally stored computer program product, with central storage of information in a database server accessible by each user terminal to enable displays and other functions described hereinabove. Furthermore, it will be understood that when formed as a website, the webpages of system 100 may be linked in any manner to, may include fewer, additional, or different links, lists, filters, entry fields, buttons, banners, panes, bars, icons, or the like to accomplish the functions described hereinabove. For example, site maps, logout links, shopping carts, counters, encryption, tiles, pop-up windows, click-through agreements, terms of service, or the like may be incorporated in addition to or in place of the above described elements to accomplish the functions of system 100.

Similarly, the methods and subsystems described herein, such as the ranking system and the reward system, among others, may preferably be modified and/or omitted to suit the needs of users. Specifically, different grading scales, rewards, or the like may be used without departing from the scope of the invention.

It will further be understood by one ordinarily skilled in the art that a system according to the present invention may be used for creation, transmission, compilation, and/or distribution of additional and/or alternative forms of data. For example, data corresponding to simple speech, such as a sermon, a poetry recital, a dissertation, or the like may be captured, transmitted, shared, modified, and/or distributed using system 100, or a similar system. Another example involves the capture, transmission, sharing, modification, and/or distribution of video data, either along or in connection with audio data.

Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed:

1. An online performance system to facilitate real-time musical collaborations, comprising:
    a server computer that creates a synchronized audio performance online venue in substantially real time by combining streams of audio connected to a network and the Internet, the server computer receives streams of audio data from a plurality of computers connected together by the Internet thereby allowing users of the plurality of computers to musically interface with one another through the server computer, wherein a graphic interface is provided to each of the client computers from the server computer;
    a first client computer of the plurality of computers connected to the Internet that converts a first audio into a first streamable data and transmits the first streamable data to and from the server computer, the first streamable data being included in the synchronized audio performance in substantially real time, wherein the audio from the first client computer influences the performance on a substantially real time basis to create another performance;
    a second client computer of the plurality of computers connected to the Internet that converts a second audio into a second streamable data and transmits the second streamable data to and from the server computer, the second streamable data being included in the synchronized audio performance in substantially real time; and
    at least a third client computer of the plurality of client computers that does not provide streamable data for the synchronized audio performance and that accesses the synchronized audio performance in substantially real time from the server computer, the at least a third client computer comprises an interface to allow users to receive and hear the synchronized audio performance from the server computer, a user of the at least a third client computer of the plurality of client computers rates the synchronized audio performance after accessing the synchronized audio performance for a predetermined amount of time, wherein the predetermined amount of time is about thirty seconds, the third client computer of the plurality of client computers is configured to allow the user to synchronously rate the synchronized audio performance adjustably throughout the synchronized audio performance and for a predetermined amount of time after the synchronized audio performance is complete, wherein the predetermined amount of time is about thirty seconds, and wherein the synchronized audio performances are rated based on a rating system provided from the server.

2. The system as claimed in claim 1, wherein the server computer uses a beat or rhythm from one of the client computers to synchronize the audio.

3. The system as claimed in claim 1, wherein the server computer uses an independent beat or rhythm from one of the client computers to synchronize the audio.

4. The system as claimed in claim 1, wherein the performance results from coupling the streams of music from the client computers at the server computer.

5. The system as claimed in claim 1, wherein the synchronized audio performances are saved on the server computer.

6. The system as claimed in claim 1, wherein the synchronized audio performances are saved on any one of the plurality of computers.

7. The system as claimed in claim 1, wherein the rates can be achieved by votes received from users of a plurality of client computers connected to the network.

8. The system as claimed in claim 1, wherein the synchronized performance receives at least one of points or credit based on a rating it receives.

9. A method of creating a ratable musical performance using streamable music in substantially real time comprising the steps of:
    converting analog audio from at least two computers into streamable music data;
    transmitting the streamable music data, using the Internet, from at least two computers to and from a server computer;
    combining and synchronizing the streamable music data from the at least two computers into a performance on the server computer on a substantially real-time basis;
    changing the performance into another performance by altering the analog audio from the first client computer on a substantially real time basis, wherein the audio at the first computer is altered by altering the streamed data transmitted from the first computer; and
    transmitting the combined and synchronized performance to a plurality of computers that do not produce streamable music data for the performance, wherein a graphic interface is provided to each of the plurality of computers from the server computer, wherein the graphic interface allows the plurality of computers to receive and hear the performance from the server computer, the plurality of computers allow users to rate the synchronized performance in substantially real time with the streamable music data being transmitted from the server computer, the plurality of computers further configured to allow the users to synchronously rate the synchronized performance adjustably throughout the synchronized performance and for a predetermined amount of time after the synchronized performance is complete, wherein the predetermined amount of time is about thirty seconds, and wherein the synchronized performances are rated based on a rating system provided from the server.

10. A method of operating an online performance venue comprising the steps of:
providing a server computer and a plurality of user terminals operably connected thereto, the server computer accessible by a plurality of users via the plurality of user terminals, wherein a graphic interface is provided to each of the plurality of user terminals from the server computer;
inviting users at multiple user terminals to transmit audio in real time to the server computer;
inviting one of the users to transmit audio data and to create an initial beat that will be used to synchronize any other audio for a performance in substantially real time;
allowing the audio from a first client computer to change the performance, by altering the audio streamed from the first computer, on a substantially real time basis to create another performance;
converting the audio from the client computers into streamed audio in substantially real time;
streaming the streamed audio from the multiple computers to the server computer through the Internet;
capturing and synchronizing the audio data at the server using the initial beat from one of the computers on a substantially real-time basis; and
transmitting the synchronized audio data to at least one user terminal that does not transmit audio in real time to the server computer, wherein the at least one user terminal comprises an interface to allow users to receive and hear the synchronized audio data from the server computer, the at least one user terminal allowing a user to rate the synchronized audio data in substantially real time with the audio data being transmitted from the server computer, the at least one user terminal further configured to allow the user to synchronously rate the synchronized audio data adjustably throughout performance of the synchronized audio data and for a predetermined amount of time after performance of the synchronized audio data is complete, wherein the predetermined amount of time is about thirty seconds, and wherein the performances of the synchronized audio data are rated based on a rating system provided from the server computer.

11. The method as claimed in claim 10, further comprising querying users to rate the musical performances based on preferences.

12. The method as claimed in claim 10, wherein the performance of the synchronized audio data results from the coupling of the audio from the client computers at the server computer.

13. An online performance system to facilitate real-time musical collaborations, comprising:
a server computer that creates a synchronized audio performance online venue in substantially real time by combining streams of audio connected to a network and the Internet, the server computer receives streams of audio data from a plurality of client computers connected together by the Internet thereby allowing users of the plurality of computers to musically interface with one another through the server computer, the server computer further providing an interface allowing users to access pre-rated performances and informal performance areas, the server computer also providing an interface allowing users to browse and create encyclopedia entries specific to at least one of composers, lyricists, instruments, eras, and symbols, the server computer further provides a graphical interface to each of the plurality of client computers allowing users to engage in a discussion forum relating to synchronized audio performances;
a first client computer of the plurality of computers connected to the Internet that converts a first audio into a first streamable data and transmits the first streamable data to and from the server computer, the first streamable data being included in the synchronized audio performance in substantially real time, wherein the audio from the first client computer influences the synchronized audio performance on a substantially real time basis to create another performance;
a second client computer of the plurality of computers connected to the Internet that converts a second audio into a second streamable data and transmits the second streamable data to and from the server computer, the second streamable data being included in the synchronized audio performance in substantially real time;
at least a third client computer of the plurality of client computers that does not provide streamable data for the synchronized performance and that accesses the synchronized performance that includes streamable data from the first and second client computers in substantially real time from the server computer, the at least a third client computer comprises an interface to allow users to receive and hear the performance from the server computer, the at least a third client computer of the plurality of client computers rates the synchronized performance after accessing the synchronized performance for a predetermined amount of time, wherein the predetermined amount of time is about thirty seconds, the at least a third client computer of the plurality of client computers further configured to rate the synchronized performance adjustably throughout the synchronized performance and for a predetermined amount of time after the synchronized performance is complete, wherein the predetermined amount of time is about thirty seconds, and wherein the synchronized performances are rated based on a rating system provided from the server.

* * * * *